United States Patent [19]

Haynes et al.

[11] Patent Number: 5,753,108

[45] Date of Patent: May 19, 1998

[54] INTEGRATED OIL RESPONSE AND RECOVERY SYSTEM AND METHOD AND SKIMMER FOR USE THEREIN

[76] Inventors: William Fredrick Haynes, 1146 Wilgart Way, Salinas, Calif. 93901; Charles Berndt Phelps, 784 Northridge, #170, Salinas, Calif. 93906; Richard John Hanahoe, 13942 Monte Del Oro, Castroville, Calif. 95012

[21] Appl. No.: 547,218

[22] Filed: Oct. 24, 1995

[51] Int. Cl.⁶ .................................................. E02B 15/04
[52] U.S. Cl. .................. 210/122; 210/170; 210/242.3; 210/923
[58] Field of Search ............................ 210/122, 170, 210/242.3, 923, 242.1

[56] References Cited

U.S. PATENT DOCUMENTS

| 3,643,804 | 2/1972 | Sharpton | 210/923 |
|---|---|---|---|
| 3,700,108 | 10/1972 | Richards | 210/242.3 |
| 3,968,041 | 7/1976 | De Voss | 210/242.3 |
| 4,425,240 | 1/1984 | Johnson | 210/242.3 |
| 4,456,536 | 6/1984 | Lorenz et al. | 210/923 |
| 5,045,216 | 9/1991 | Eller | 210/242.3 |
| 5,075,014 | 12/1991 | Sullivan | 210/242.3 |
| 5,139,363 | 8/1992 | Jenkins | 210/242.3 |
| 5,215,654 | 6/1993 | Karterman | 210/242.3 |
| 5,362,391 | 11/1994 | Stephens | 210/242.3 |
| 5,472,597 | 12/1995 | Carro | 210/122 |

FOREIGN PATENT DOCUMENTS 8001293  6/1980  WIPO .

*Primary Examiner*—Christopher Upton
*Attorney, Agent, or Firm*—Kenyon & Kenyon

[57] ABSTRACT

A skimmer for recovering spilled oil plows through the water at relatively high speeds and operates under a variety of weather conditions. To counteract the pitch and roll of the skimmer while traveling through choppy seas, the skimmer is attached to the propelling vessel by a biaxial mount, which has the shaft perpendicular to the center line of the vessel and horizontal to the water line. This allows the nose section of the skimmer to travel in a vertical direction in concert with oncoming swells and waves. The main control frame of the skimmer is hinged perpendicularly to the vessel shaft yoke to allow the main frame to roll in concert with cross waves and swells. This biaxial mounting allows the nose of the skimmer to remain at a fairly uniform depth in the water no matter which direction the waves are approaching, which allows the skimmer to be attached to virtually any vessel with size and characteristics to accommodate the mass of the skimmer. Pontoons are placed on both sides of the skimmer nose to hold the skimmer nose at a proper depth when moving forward. The pontoons are hinged so as to pivot and stay in concert with the waves and swells to maintain a uniform nose depth. The skimmer belt is a mesh design that will lift high quantities of unwanted material, especially spilled oil, and limit the amount of water that is lifted. Water jets are attached to the mouth of the skimmer to direct unwanted material or spilled oil into the skimmer.

12 Claims, 26 Drawing Sheets

SCHEMATIC OF WEIR SKIMMER

SORBENT BELT SKIMMER

OBSERVER STATIONS

INTEGRATED OIL RESPONSE AND RECOVERY SYSTEM AND METHOD AND SKIMMER FOR USE THEREIN

FIELD OF THE INVENTION

The present invention relates generally to mechanical methods and devices for efficiently removing unwanted floating substances or materials from water, especially oil from oil spills, and more particularly to a skimmer for use in a mechanical method of removing unwanted floating substances or materials from water.

BACKGROUND OF THE INVENTION

On Mar. 24, 1989, the Exxon Valdez ran aground in Prince William Sound, Ak. The resulting oil spill has been estimated at 10,800,000 gallons of oil. While this oil spill was catastrophic, it was by no means even close to the largest oil spill ever. In 1979, the Ixtoc I spilled between 139,000,000 and 428,000,000 gallons of oil—13 to 40 times the size of the Exxon Valdez spill! Nevertheless, the Exxon Valdez accident was the largest spill in U.S. history.

Since 1967, oil spills have been occurring worldwide at a rate of 3–5 per year. Yet existing technology and techniques for responding to oil an spill remain grossly inadequate. The technology now available for oil spill cleanup in the United States and abroad has many limitations affecting capabilities in real world situations. This has resulted in only very small percentages of actual cleanup for almost all past major ocean spills. Some sources claim that the most oil that can be recovered after a major spill is 10 to 15 percent. A study by the U.S. Congress Office of Technology Assessment (OTA) showed that the actual oil recovered at sea has been less than 10 percent of the oil discharged, and usually much less. While improvements in existing management responses may improve this estimate, the fact remains that real world conditions severely restrict the capability of existing equipment.

Many claim that techniques other than mechanical recovery could be used to mitigate the effects of a large offshore oil spill without actually picking up the oil. These techniques include the use of dispersants and burning. In fact, these other techniques have seldom been used successfully. In some cases public concerns about side effects have prevented their use (these include possible toxic effects from dispersed oil and air emissions from burning oil). In other cases, sea conditions and the condition of the spilled oil have resulted in poor performance of these techniques.

Several key findings from an OTA evaluation of Oil Spill Response Technologies include:

Boom containment and recovery is the primary U.S. oil spill response method, yet this technology has many limitations, which have limited their effectiveness to date.

Current mechanical containment and recovery technology is not usually effective in waves greater than 6 feet, winds greater than 20 knots, and currents greater than 1 knot (perpendicular to a boom), however, wind and current conditions in U.S. port areas often exceed these limits, leaving little margin for the effective use of existing mechanical equipment. Conditions in open seas are usually much worse.

To understand the inadequacy of the existing technology, a brief overview of the existing technology is necessary.

OIL SPILL RESPONSE TECHNOLOGIES

The capability to respond effectively to a major offshore oil spill is a combination of three principal factors:

1. the physical conditions at the time of the accident or spill;
2. the suitability, capacity, and availability of the technology deployed to fight the spill; and
3. the skills, training, readiness, and decision making capabilities of the organizations and people with responsibilities for combating the spill.

Adverse physical conditions that may be present at any spill site always contribute to the difficulty of responding efficiently and effectively. Some of the key conditions that affect a response effort include:

Spreading of Oil. Oil spilled on the water spreads rapidly. The spreading rate depends on the type of oil, its volume, wind and sea conditions, and the amount of weathering that occurs. FIG. 9 shows the effect of spreading for calm water conditions and uniform slick thickness—not necessarily real world conditions. It can be seen that, for an Exxon Valdez type of spill, the oil can spread over 6 square miles (almost 4,000 acres) during the first 12 hours. If all of the containment boom in the U.S. Navy inventory could be deployed to this type of spill site within the first 12 hours, it would barely be enough to encircle such a spill. In fact, the U.S. Navy response was not even requested until more than 1 week after the Exxon Valdez accident.

The huge area encompassed by a large spill means substantial amounts of equipment are needed to respond. Spreading also enhances evaporation and solution of the oil by creating a large active surface area. In addition, an oil slick tends to fragment into a number of smaller patches with time, and thus, even larger total surface areas must be covered with any available recovery equipment.

Composition of Oil. The viscosity of the oil can be a critical factor in the response effort. In addition, oil spills in rough seas quickly become emulsions as they mix with water and form a colloidal dispersion sometimes called "chocolate mousse," a substance which is very difficult to pump. High viscosity oils are more difficult to recover mechanically and disperse more slowly than low viscosity oils. Also, weathering processes such as evaporation, water take-up, oxidation, and biodegradation will increase the viscosity. Certain crude oils (such as Alaskan crude) become very difficult to pump when temperatures reach about 0 to 5 degrees Celsius. In addition, the effectiveness of dispersants and the burning process decreases as viscosity and emulsification increase. Also, the total volume of oil/water emulsion (mousse) can reach several times the initial oil spill volume.

Sea Conditions. Most existing mechanical equipment becomes much less effective in waves greater than 3 to 6 feet. In addition, small vessels cannot be used, and deployment of gear in rough seas can be difficult. Currents can cause oil to move in unpredictable directions, and booms become ineffective when current velocity exceeds about 1 knot perpendicular to the face of the boom.

Weather Conditions. Weather such as snow, fog, heavy rain, high winds, and low temperatures all adversely affect the deployment and operation of equipment.

Location of Spill. If the spill is near the shoreline and the drift is toward shore, it will be very difficult to prevent beach contamination, no matter how ideal the conditions. The more remote a spill, the more difficult it is to get equipment to the site quickly.

Logistics. It is critical to be able to move equipment and personnel to the spill site as rapidly as possible. Also, all aspects of the transportation network are important—barges and other support vessels are often overlooked or not available.

Safety. Response to a large spill must include consideration of fire and explosion potential of the slick under the right temperature and atmospheric conditions. The protection of people aboard the vessel and those working on clean-up operations is critical. The safety of the stranded vessel itself is also important, especially if part of the cargo can be recovered before it is all spilled.

The above factors affect the ability of any response effort to mitigate the effects of a large offshore spill. The major categories of existing technologies of oil spill response include: mechanical recovery; dispersants; and burning, bioremediation, and other techniques. In general, none of the currently available technologies are adequate to respond to and mitigate major offshore spills of the Exxon Valdez type and size (over 10 million gallons).

In the United States, almost all of the existing technology in the private sector has been developed for use in harbors and other protected waters. The Coast Guard and the Navy have equipment in their inventory that was designed for offshore areas in terms of deployability and ruggedness, but it is limited to moderate sea states, low currents, and moderate-size spills. No private U.S. oil spill cooperative has the ability to deal with large, catastrophic spills. The few large cooperatives in the United States have equipment that is more appropriate for platform spills. The Coast Guard has only minimal equipment of its own and depends, in large part, on private industry to supply systems to respond to spills.

The Coast Guard has not developed any new equipment in recent years, and the number of strike teams has been reduced from three to two. The Navy's spill response capability is probably more substantial than that of any other government agency, but its equipment has been designed to be air-transportable and, thus, it is limited in size and capacity.

Mechanical Spill Response Technologies

Mechanical recovery of spilled oil can be accomplished by a variety of techniques. A large number of different systems have been designed and built over the last 20 years. The *World Catalog of Oil Spill Response Products*, for instance, includes hundreds of harbor, calm water, and offshore booms and skimmers designed for a variety of spills and conditions, in addition to hundreds of sorbants that soak up oil. Oil spill containment and cleanup technology has improved marginally over the past two decades, but private and Federal research efforts in the United States diminished greatly in the 1980s. Mechanical spill response technologies can be divided into two major categories: containment booms and oil recovery devices. Several containment and cleanup devices are discussed below.

Mechanical Containment and Cleanup Technologies

Containment Booms

Oil spill containment barriers or booms are floating devices generally resembling short curtains that restrict an oil slick from spreading beyond the barrier. Several designs have been produced for conditions ranging from protected waters to open ocean. Some barriers are designed to be towed, while remain stationary. Barriers designed for protected waters would be less effective in strong currents or heavy waves but generally are more easily deployed than offshore booms.

Float

The float is the buoyancy member that keeps the boom riding on the surface of the water. Heavier booms or booms used in rough seas need more buoyancy and therefore have a larger volume of float materials. Floats may be rigid or flexible and should be relatively smooth so that they do not trap debris or produce vortices that may cause the loss of oil under the boom.

Freeboard

The freeboard is the vertical height of the boom above the water. The freeboard prevents oil from washing over the top of the boom, but if it is too high, the boom may be pushed over in high winds. The boom must be flexible enough to rise and fall with the waves so that the freeboard is not lost with each passing wave.

Skirt

The skirt is the continuous portion of the boom below the float. The skirt helps to contain the oil. While a deeper skirt is more effective in containing oil, increasing skirt depth increases the current load on the tension members of the boom.

Tension member

Tension members consist of any elements such as cables, chains, lines, or boom fabric that carry the horizontal tension loads on the boom.

Ballast

Weight is applied to the bottom of the skirt to improve boom performance. Ballast is generally a chain (which also serves as a tension member) or a series of weights along the entire length of the boom.

There are two basic types of booms in general use today: fence booms and curtain booms. Fence booms have a rigid or semirigid material as a containment screen for oil floating on the water. Curtain booms have a flexible skirt held down by ballast weights or a tension chain or cable. Their major difference is the way in which they respond to waves, current, and wind. If current and wind roll a fence boom away from the vertical, there is a loss of freeboard and draft. A curtain boom has a flexible skirt that is free to move independently of the freeboard and floatation, thus movement of the skirt away from vertical does not necessarily mean loss of freeboard. Other booms, not necessarily of different types, are designed for special purposes. These include fireproof booms, ice booms designed for spills in ice-filled water, and sorbant booms used to contain and absorb small amounts of oil in relatively calm waters.

Booms are classified according to their physical characteristics, which include freeboard, draft, reserve buoyancy to weight ratio, total tensile strength, skirt fabric tensile strength, and skirt fabric tear strength. Although all of these characteristics are important, only the freeboard and draft will be mentioned here to convey an idea of the overall size of booms that are used for various applications.

In the above classification, based on that used in the World Catalog of Oil Spill Response Products, calm water is defined to have significant wave height of less than 1 foot, harbors less than 3 feet, and offshore less than 6 feet. The significant wave height is the maximum wave height for which booms in that category are likely to be effective. Booms recommended for harbors and offshore are quite large. A boom recommended for harbors would have a vertical dimension (freeboard plus draft) of 22 to 42 inches and a boom recommended for offshore use would have a vertical dimension of more than 42 inches.

These classifications should be used with some flexibility. For example, offshore booms typically have long skirts. However, in offshore areas of fast currents a shorter skirt may be more effective. In this case, a boom classified as a harbor boom may be more suitable than an offshore boom.

Mechanical Recovery Devices

Several devices have been developed to collect oil from surface waters. Since the efficiency of an oil recovery device is improved by increasing the thickness or depth of an oil slick, these devices are frequently used in combination with containment barriers. Oil spill recovery skimmers are generally separated into categories according to the way in which they pick up oil. Fourteen categories and subcategories can be identified. These are defined as follows:

Weir—A skimmer that has an interior basis with a slightly submerged lip over which the oil floats and is collected by gravity (FIG. 10). The weir is generally a floating skimming head used with a pump to continuously empty the collecting basin. These skimmers work best if the edge of the weir is right at the oil/water interface, but in practice, this adjustment is difficult to achieve and maintain. Weir skimmers have the advantages of being simple, reliable, and commonly available. In thick layers of oil (25 mm or more), weir skimmers have high recovery rates with a recovery efficiency of around 50 per cent. In thinner slicks (1 to 8 mm), the recovery efficiency drops to 10 per cent. Conventional floating weir skimmers have problems in becoming clogged with debris and do not work well in waves. Archimedes screw devices have been incorporated in some weir skimmers to grind up debris.

Suction—A suction skimmer is a simple suction head acting somewhat like a weir used on a floating hose from a vacuum truck or portable suction pump (FIG. 11). Pump suction draws the oil to the skimmer head. This also is the same principle used when a suction hopper dredge is converted to oil spill recovery. The advantages of suction skimmers are that they are simple to operate, shallow draft, and can be used nearly everywhere, even under piers. They are likely to have a fairly high pumping rate but with a low recovery efficiency, particularly in a thin slick. They are not effective, however, if there is any appreciable water movement such as choppy waves.

Boom Skimmer—A boom skimmer is a recovery system with one or more skimmers mounted in the face of a spill containment boom, regardless of the skimmer type, although the recovery device is generally a weir (FIG. 12). Weirs installed on booms that can follow the wave surface reasonably well are kept near the surface of the water and therefore able to maintain a high rate of recovery. In general, boom skimmers have a high rate of recovery and are designed for dealing with large spills at sea. Since the weir is employed in the collection pocket of the boom, recovery efficiency is increased. Boom skimmers are large pieces of equipment with many working parts needing maintenance. They are adversely affected by the same debris problems as other weirs.

Vortex—A vortex skimmer draws oil and water into a collection chamber and separates it by centrifugal force (FIG. 13). This centrifugal action discharges the water out of the bottom and concentrates the oil so that it can be pumped off through a hose to storage. This principle is sometimes combined with a weir serving as the collection chamber. Vortex skimmers can achieve a reasonable recovery rate in medium to heavy oils, but generally have a fairly low efficiency.

Moving Surface—Moving surface skimmers utilize a moving material that absorbs or causes oil to adhere to it in preference to water. The oil-coated material then passes over a scraper, squeezer, or other device to remove and recover the oil in a sump. There are several varieties of moving surface skimmers including, disk/drum, brush rope mop, and belt types as follows:

Disk/Drum—Any disk or drum devices that rely on the adhesion of oil to a solid surface (FIG. 14). Disk type devices have a series of vertical disks that are rotated through the oil surface. Drum skimmers have a horizontal drum that rotates through the slick. Many small disk simmers have the disadvantages of being expensive, complicated, more likely to break down, and vulnerable to becoming clogged with debris. On the other hand, they have high recovery efficiency which can be a considerable advantage if storage volume is limited. Large disk skimmers are likely to be more durable and some disk skimmers have vanes or screens to keep out debris. Because of the vertical dimension of the disk, disk simmers are effective in waves. Some large floating disk skimmers are effective in fairly high sea states.

Brush—Skimmer with a horizontal brush that rotates through the oil and a scraper which removes the oil into a sump. This skimmer is designed for recovering highly viscous oil and oil on ice.

Rope Mop—Rope mop skimmers employ a long, continuous loop of absorbent oleophilic (oil loving) material that floats on the surface of the water and is then led through a combination scraper-wringer that removes the oil along with some water (FIG. 15). Rope mops can be deployed from shore and the rope guided around a pulley that has been secured offshore or can be operated from boats. Rope mop skimmers generally have high recovery efficiency and are most effective in medium viscosity oils. Rope mops can operate in shallow water, water filled with debris, water mixed with ice, and under ice. They are relatively easy to maintain.

Belt—Belt skimmers are identical in that they all employ a moving belt which may or may not be of absorbent material. Six types of belt skimmers can be identified.

1. Paddle Belts—Paddles are attached to the belt to lift oil out of the water (FIG. 16). A typical paddle belt skimmer pulls oil up a ramp using four or more paddles. Paddle belt skimmers have a high recovery rate and operate best in medium to high viscosity oils, but are likely to have problems in short period waves. They also handle debris very well.

2. Sorbent Belts—A sorbent belt skimmer is one that has a continuous, flat belt that moves horizontally over the water in the well of the collection vessel (FIG. 17). High recovery rates can be expected and debris handling is excellent. This skimmer was developed for the U.S. Coast Guard as a zero relative velocity skimmer with the belt moving as fast as the vessel is traveling forward (or current moving aft). Apparently, while technically feasible, it has not been very practical operationally and has never been commercially produced.

3. Sorbent Lifting Belts—A sorbent belt skimmer that has a belt inclined to the water's surface that lifts the oil out of the water (FIG. 18). Sorbent lifting belts are made of porous oleophilic material that allows water to pass through. The belt passes through a set of rollers where the oil is scraped and wrung out of the belt. Sorbent lifting belt skimmers are often mounted on fairly large vessels and are intended for use in harbors and offshore. They can be expected to have a high recovery rate and high efficiency.

4. Brush Lifting Belts—These skimmers have a chain of brushes that lift the oil from the water. Cleaning devices remove oil from the brushes at the top of the ramp. These would particularly useful in large spills of high viscous oil.

5. Submersion Belts—The operating principle of submersion belt skimmers is the opposite of lifting belt skimmers (FIG. 19). Instead of carrying the oil up out of the water, the submersion belt moves along a plane forcing the oil under water. The oil then surfaces in a collection sump. Submersion belt skimmers work best in low viscosity oils and thin slicks, in contrast to most other skimmers that require thick accumulations of oil for most effective operation.

6. Sorbent Submersion Bells—These skimmers have a submersion belt that also acts as a sorbent. The belt passes through a set of rollers that remove the oil. Oil that is not absorbed is carried beneath the belt and rises in a collection chamber located aft of the belt. These skimmers are effective in light to heavy oils in thicknesses of several millimeters and work best in calm seas or moderate seas with a swell up to 3 feet.

Submersion Plane—The submersion plane skimmer has a fixed plane which is advanced through the oil, submerging it and directing it into a collection area aft. It is similar to the submersion belt skimmer except that it does not have any moving parts. Submersion plane skimmers work best in light to medium viscosity oils.

Some of the above existing skimmers are placed behind or on booms and work as the water flows past the skimmer. The pick up mechanism of these skimmers must be attached to a larger vessel for propulsion and collection of material. This is often a vessel of opportunity, difficult to find in an emergency and not always suited to the task at hand. The effect of any sort of wave action varying the pitch and roll of the larger vessel is more pronounced at the point of pick up than it is on the more massive larger vessel. This results in the pick up portion of the skimmer either plunging too deeply, or, in some cases, rising completely out of the water. Obviously, a skimmer which is designed to operate behind a boom cannot remove the oil in these circumstances.

Belt, or other types of skimmers rigidly mounted to a host vessel, are known as fixed angle skimmers. These skimmers, when forged forward through the water at a speed great enough to lift a sufficient amount of material, tend to be forced downward in the water, requiring speeds too slow to be effective. Weir type skimmers, defined as skimmers that rely on chambers and baffles to capture the oil and are connected to a pumping system to transfer the oil to a receptacle, are capable of recovering only small quantities of material and are limited further by being in a relatively stationary position. Many types of skimming mechanisms have been built and tested, as described above, and all of them are limited by one or more of the following shortcomings:

Lack of mobility

Slow recovery speed

Recovery of too large a ratio of water to material

Incompatibility to host vessel

Inability to operate in any conditions other than calm water

Inability to recover an acceptable quantity of encountered material

The present invention is therefore directed to the problem of developing a highly efficient skimmer for use in an oil recovery system, which skimmer can operate under a variety of weather and wave conditions and with a variety of boats and at a relatively fast speed.

SUMMARY OF THE INVENTION

The present invention solves this problem by providing a skimmer including: (1) a biaxial mounting to a vessel; (2) a floating conveyor for picking up the oil; and (3) a variable ballast floatation mechanism that maintains the mouth of the skimmer at the surface of the water, yet permits the skimmer to be plowed through the water at relatively high speeds. The present invention also includes a device and a method for accommodating solid debris that might be encountered during skimming operations. The skimmer of the present invention thus makes possible a rapid oil recovery system that was heretofore not possible.

The primary consideration in the design of the skimmer is to enable it to perform in motion and under a variety of sea conditions. It must also recover unwanted floating material at a high rate and with an acceptable ratio of oil to water. The present invention is able to accommodate all of these concerns because the biaxial mounting, coupled with the ballast controlled floatation system, maintains the mouth of the skimmer level at the water surface, despite wave action that is not synchronous with the waves causing the host vessel to pitch and roll.

By maintaining the mouth of the skimmer at the water surface, downward forces on the skimmer are minimized. These forces can become very large as the speed of the host vessel increases and as the size of the skimmer increases. Minimizing these downward forces enables the skimmer to be pushed through the water at a relatively high speed (e.g., six knots), which has not been possible to date. In order for existing skimmers to operate effectively, they are limited to forward speeds of zero (0) to one and one half (1½) knots.

By increasing the speed of the skimmer, more effective cleanup of the oil spill is possible. The size of the oil spill grows significantly with each passing hour, which means that response time is critical. A fast skimmer enables the cleanup operation to control the size of the oil spill, before the oil reaches an unmanageable size.

The present invention discloses a skimmer for mounting on a vessel for recovering oil from water, which vessel has a storage unit for storing recovered oil. The skimmer of the present invention includes a moving conveyor for transporting oil from the surface of the water to the storage unit. The entrance of the conveyor is placed at the surface of the water. A least two water jets mounted near the entrance of the conveyor are used to direct the oil into the conveyor. The oil falls through the mesh conveyor into a channel that includes an auger type conveyor to guide the recovered oil into a sump. A sweep is mounted above and resting on the conveyor at the opening of the sump and forces any residual oil downward and into the sump. A biaxial mounting apparatus is used for mounting the skimmer on the vessel so that the entrance of the skimmer remains level in the water. At least two ballast controlled pontoons located near the entrance of the conveyor maintaining the entrance of the conveyor at the surface of the water. A traverse solid debris conveyor is attached to the host vessel.

An advantageous method for skimming oil from a surface of water includes the steps of directing the oil into an entrance of a skimmer, transporting the oil up a conveyor into a storage unit for temporarily storing the oil, and controlling the skimmer so that the entrance remains level in the water and substantially at the surface of the water.

An advantageous embodiment of the method according to the present invention includes the step of pushing the skimmer through the water with a host vessel.

Another advantageous embodiment of the method of the present invention occurs when the step of directing includes using at least two water jets to direct the oil into the entrance of the skimmer.

Another advantageous embodiment of the apparatus according to the present invention occurs when the coupling means comprises a biaxial mount.

Another advantageous embodiment of the method of the present invention occurs when the step of controlling includes a biaxial mounting of the skimmer to the host vessel so that the entrance of the skimmer can roll and pitch independently of any roll and pitch of the host vessel, and by varying the ballast in the floatation pontoons disposed near the entrance of the skimmer.

Another advantageous embodiment of the method of the present invention occurs when the controlling means comprises the varying of the ballast in the floatation pontoons. This is accomplished with the use of a remote air pressure system mounted on the host vessel. The air pressure system inflates the bladder in the pontoons and forces the water out through vents in the pontoons for greater floatation. The weight of the skimmer rests on the pontoons and forces the bladder to deflate as the water enters the vents in the pontoons when the air pressure is released through a bleeder valve to reduce the amount of floatation.

Another embodiment of the present invention for skimming oil from water provides means for directing water into a mouth of the skimmer, means for coupling a biaxial mounting to the skimmer body so that the skimmer can pitch and roll independent of the host vessel's pitching and rolling and the mouth of the skimmer can remain parallel to the surface of the water.

Another advantageous embodiment of the method of the present invention occurs when the step of transporting further includes using an endless belt-type conveyor comprising pockets that each hold a small amount of oil and which empty their contents by means of gravity and a sweep as the belt reaches the top of the conveyor and rolls over a roller to return to the entrance of the conveyor.

Another advantageous embodiment of the method of the present invention occurs when the step of transporting further includes using an auger type conveyor in a channel below the main conveyor that transports the oil upward into a sump.

An advantageous embodiment of the apparatus according to the present invention occurs when the directing means comprises a plunging water jet.

Another advantageous embodiment of the apparatus according to the present invention occurs when the step of transporting solid debris up the main conveyor and drops the solid debris to the traverse debris conveyor for transfer to an attending barge or other vessel.

DETAILED DESCRIPTION

Figure 1:
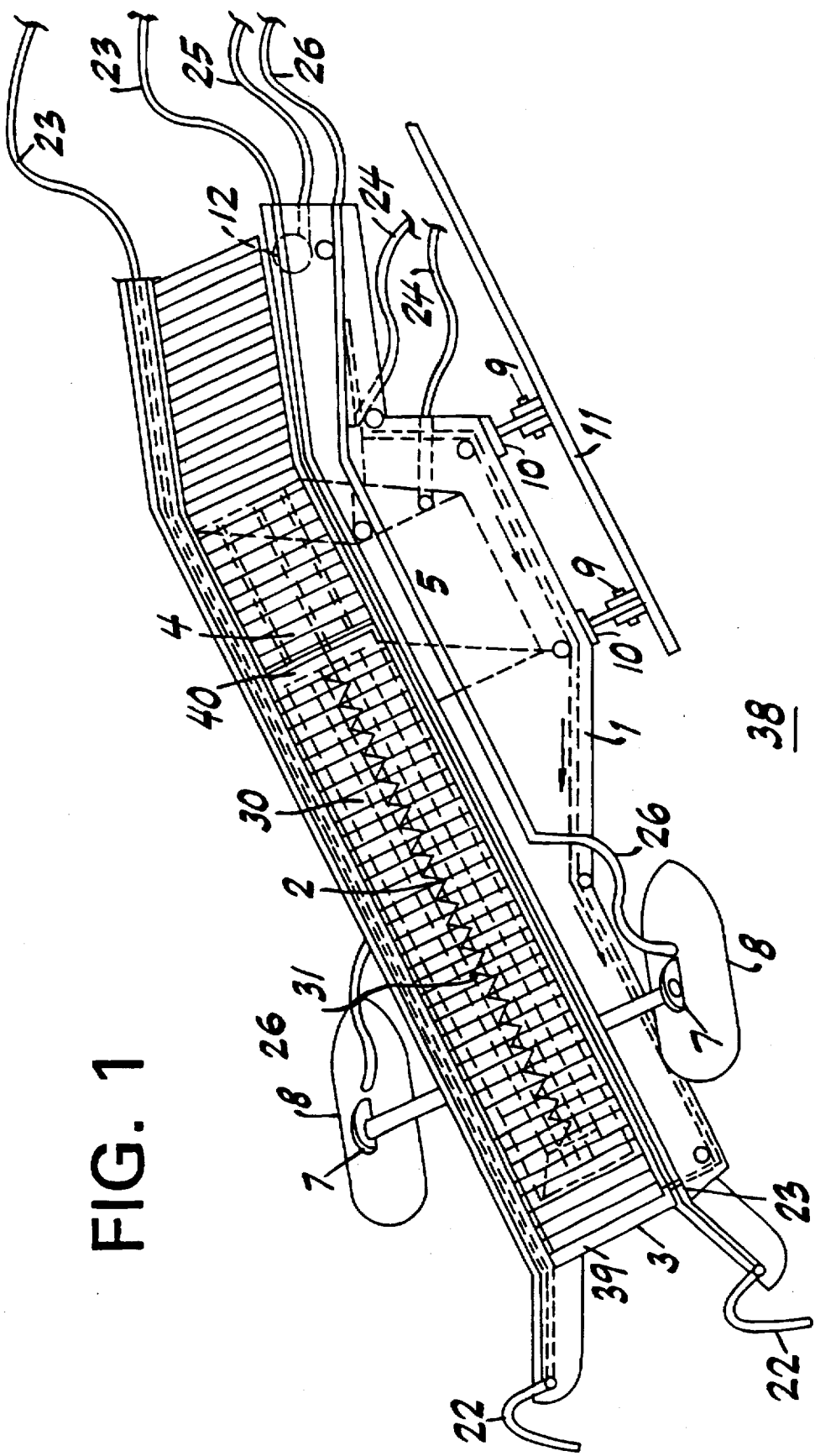
FIG. 1 depicts the skimmer of the present invention, top view.

Referring to FIG. 1, the skimmer 38 of the present invention is a specially designed conveyor type skimmer, which is constructed of aluminum, stainless steel and composite material and is equipped with its own floatation package consisting of a number of pontoons 8 with variable pressurization systems utilizing submarine technology. The combination of the specially designed conveyor type skimmer 38 with ballast controlled floatation pontoons 8 and a biaxial mounting 43 (FIG. 3) to the vessel 21 permits the skimmer 38 of the present invention to recover oil much quicker and with greater efficiency than was heretofore possible.

Conveyor Type Skimmer

As shown in FIG. 1, plunging water jets 22 are attached to the front of the skimmer 38 and above the mouth 3 of the skimmer frame 1 to direct the unwanted material or spilled oil into the mouth 3 of the skimmer 38. Water is supplied through water lines 23 that run along the external side of the skimmer body 1 and are connected to pumps (not shown) located on the host vessel 21.

The skimmer is made of a frame 1 with two vertical sides, a collection channel 30, an optional auger type conveyor 31 and a moving conveyor 2. The two conveyors 2, 31 are mounted on the frame 1. The main conveyor frame 1 is equipped with rails 4 which support the main conveyor 2. The main conveyor 2 has an endless belt 39 on which the oil and/or debris is carried up the skimmer 38. In addition, a further refinement of the present invention includes an optional secondary conveyor 31 mounted below the main conveyor 2.

Figure 2:
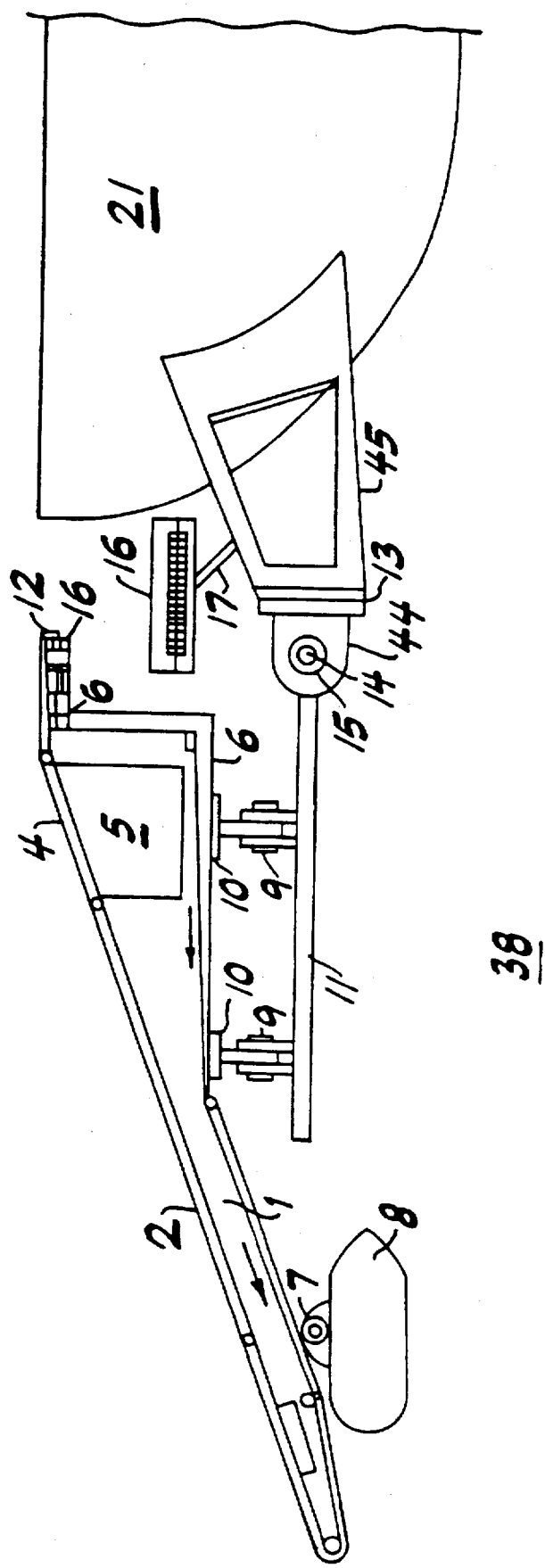
FIG. 2 depicts the skimmer of the present invention, side view.

According to the present invention, the skimmer 38 includes a main conveyor 2 with an endless belt 39 that will lift high quantities of unwanted material, especially spilled oil, and limit the amount of water that is lifted. The skimmer belt 2 is driven by a hydraulic propulsion system 12 with power supplied through hydraulic lines 25 and connected to a hydraulic pump system (not shown) located on the host vessel 21. As shown in FIG. 2, the belt runs over rollers 6 up the conveyor body 1, over the sump 5 and back through skimmer body 1 to the mouth 3 of the skimmer 38.

Figure 4:
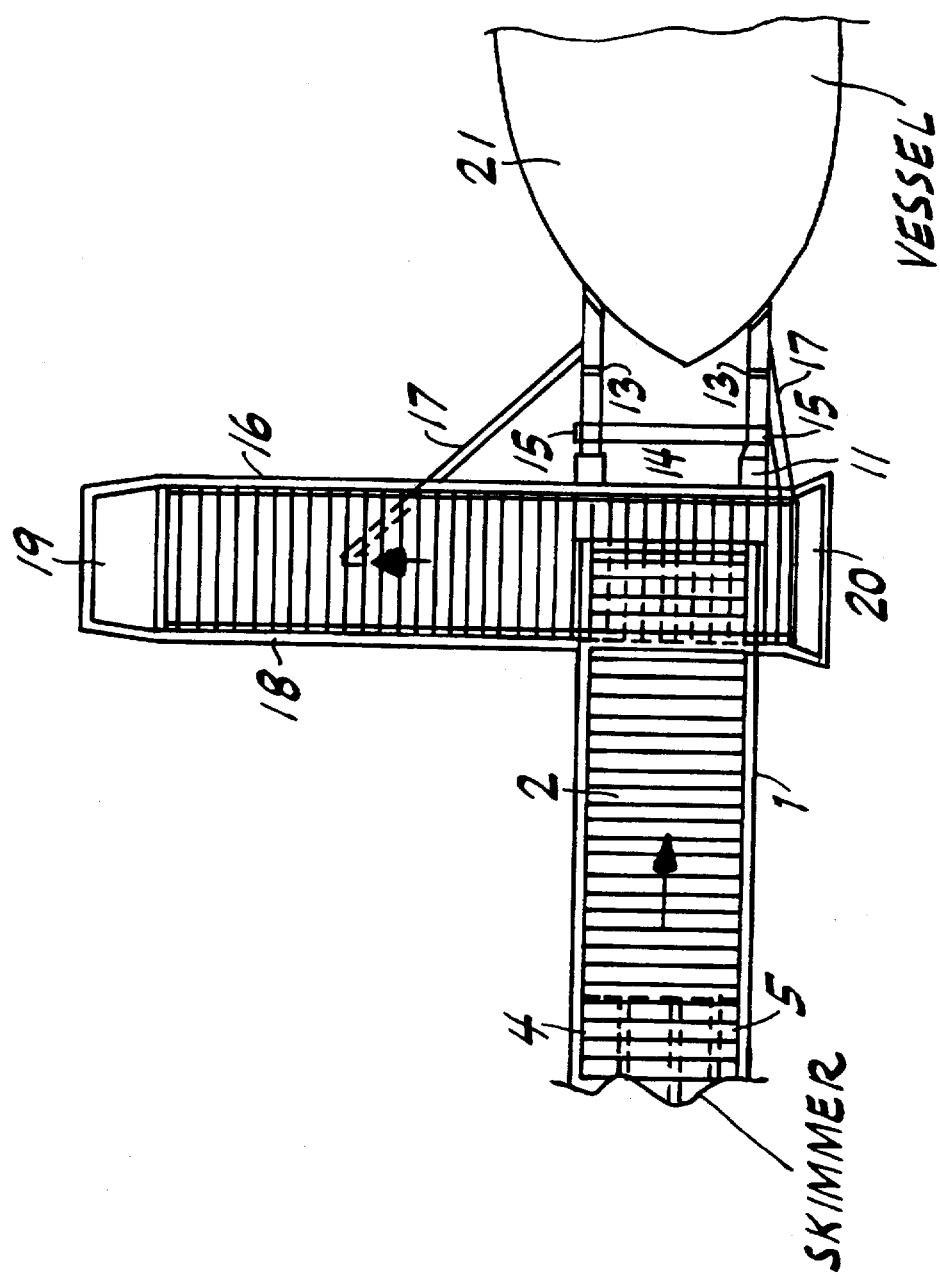
FIG. 4 depicts the traverse solid debris skimmer according to the present invention, top view.
Figure 8A:
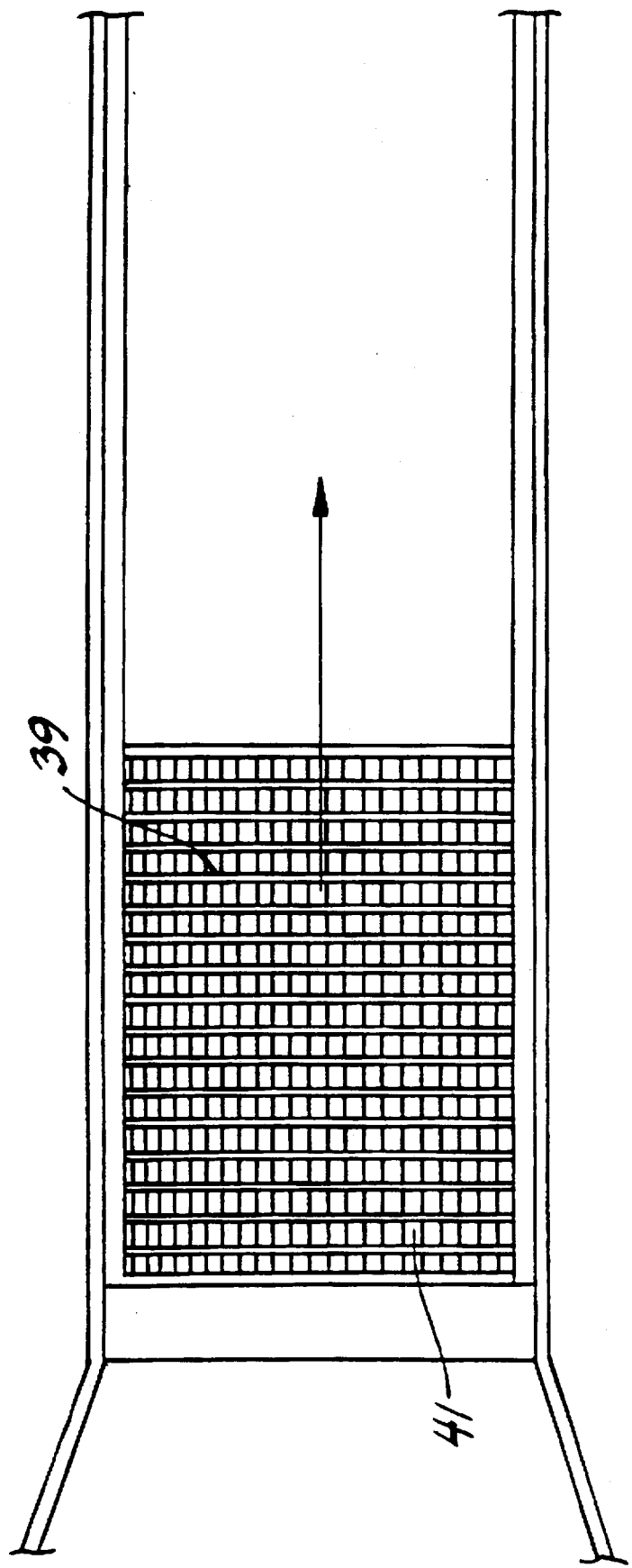
FIG. 8A depicts one embodiment of the endless belt material according to the present invention, in top view.

The first embodiment of the endless belt 39 (shown in FIG. 8A) is a mesh/screen material through which the oil falls, but on which debris is carried to the top of the skimmer 38 and discarded by an optional transverse conveyer 16 depicted in FIG. 4.

Figure 8C:
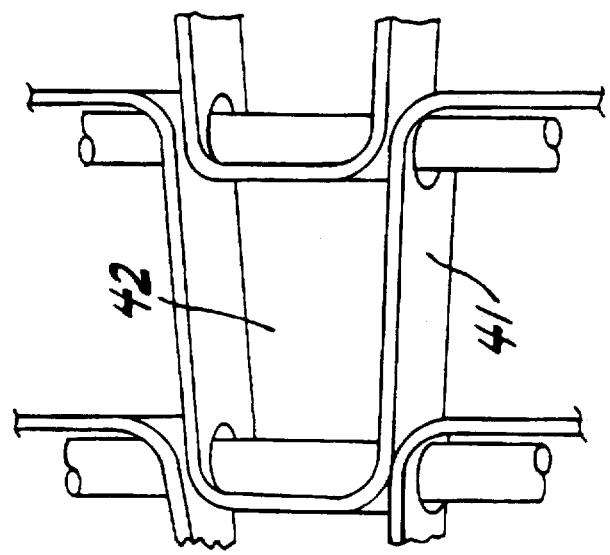
FIG. 8C depicts one of the microbuckets in the embodiment of the endless belt material in FIG. 8B, in section.
Figure 8B:
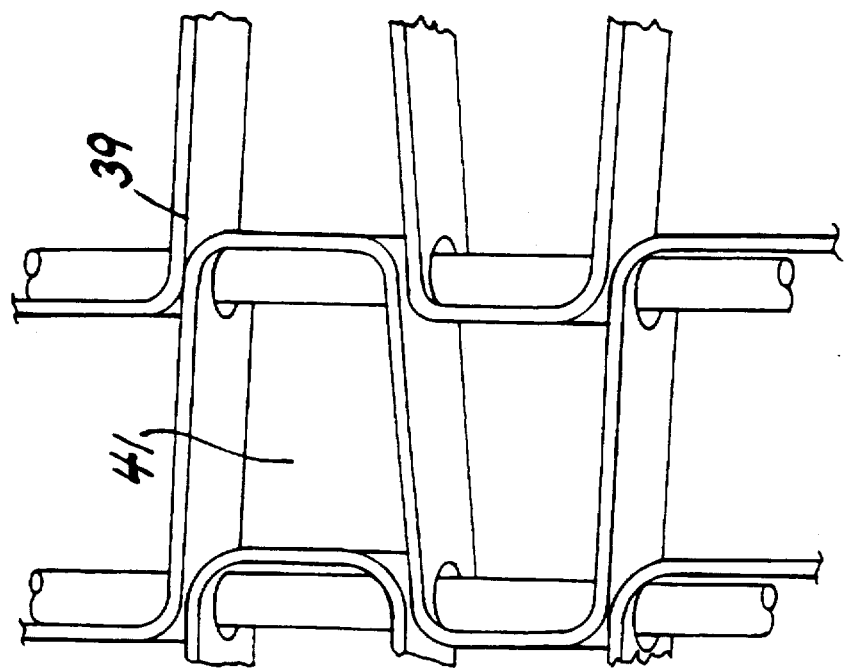
FIG. 8B depicts another embodiment of the endless belt material according to the present invention, in top view.
Figure 9:
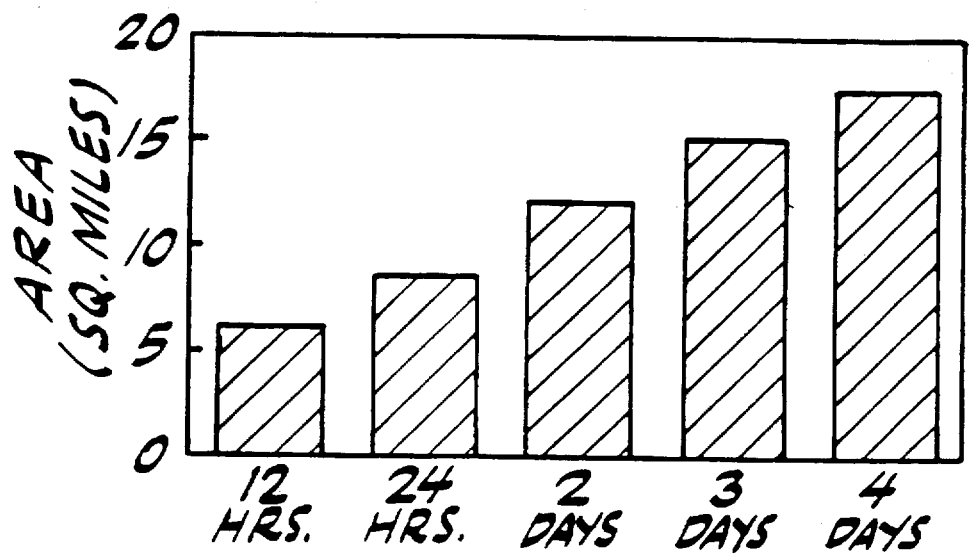
FIG. 9 shows the effect of oil spreading under calm water conditions and uniform slick thickness.
Figure 10:
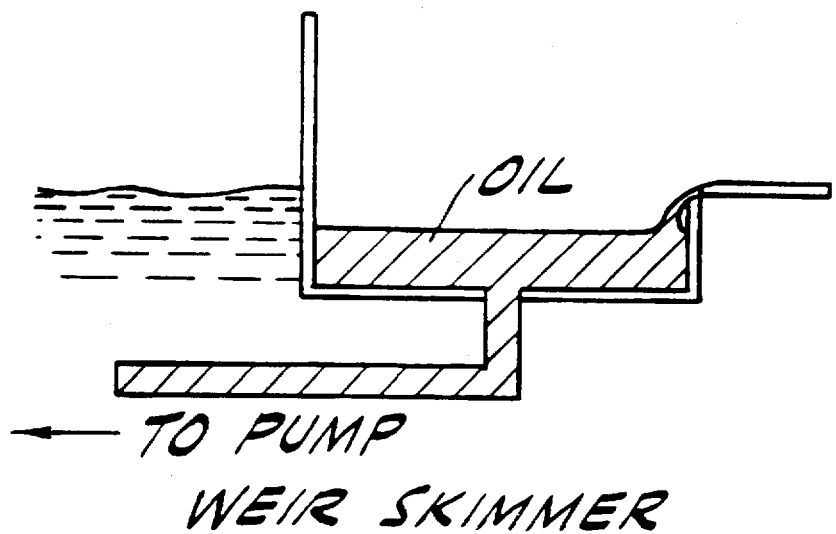
FIG. 10 depicts a prior art weir skimmer.
Figure 11:
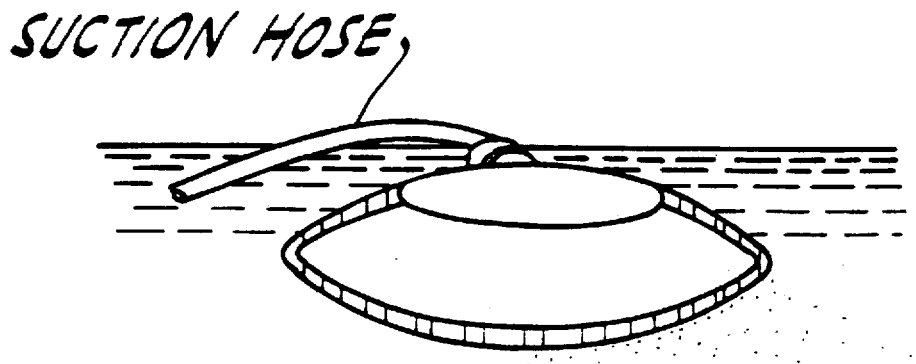
FIG. 11 depicts a prior art floating suction skimmer.
Figure 19:
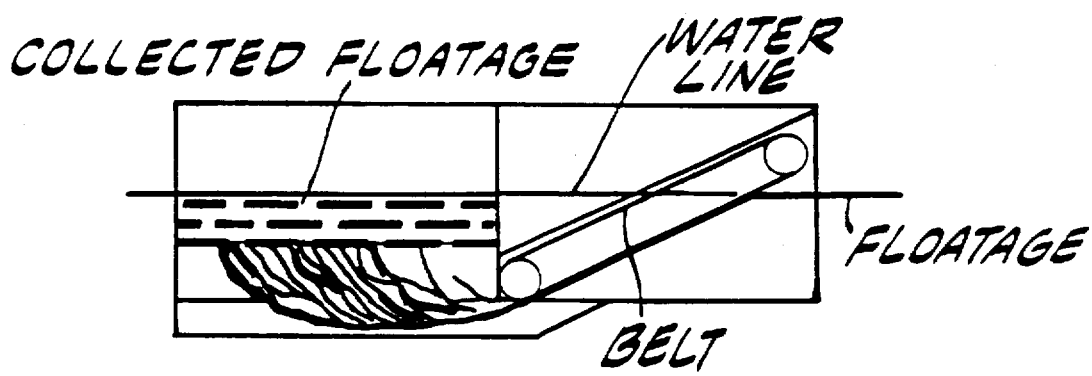
FIG. 19 depicts a prior art submersion belt skimmer.
Figure 12:
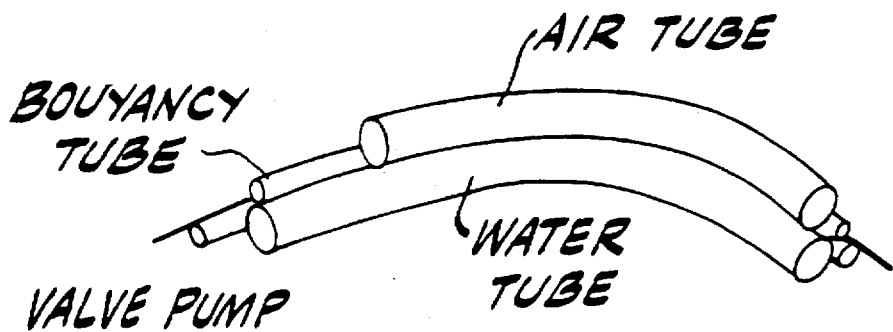
FIG. 12 depicts a schematic of a prior art weir skimmer used in a boom skimmer.
Figure 17:
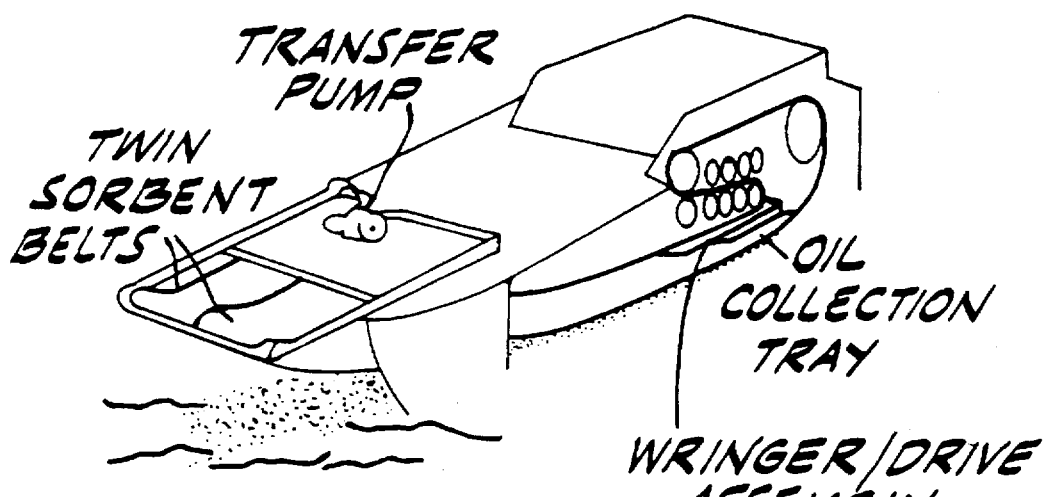
FIG. 17 depicts a prior art sorbent belt skimmer.
Figure 13:
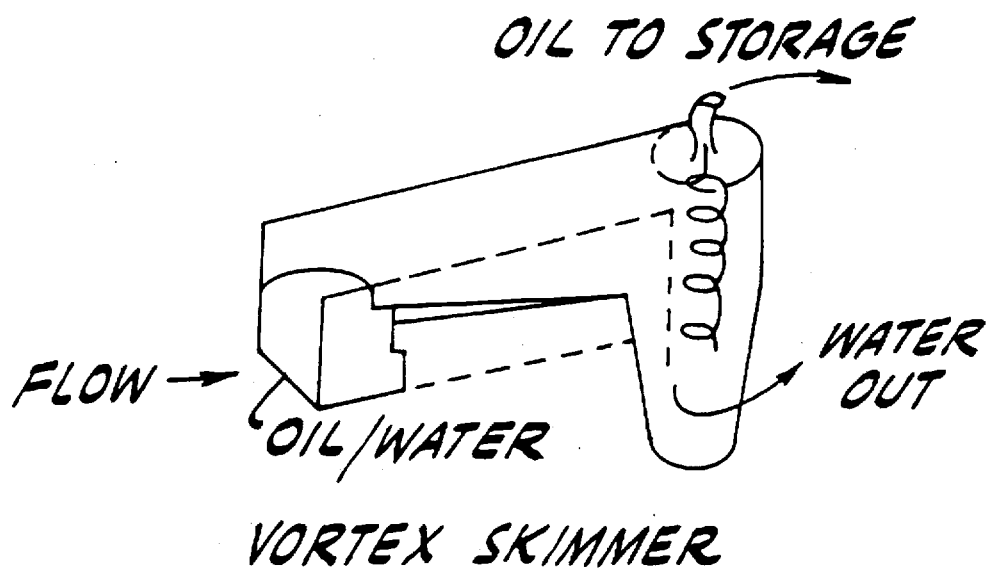
FIG. 13 depicts a prior art vortex skimmer.
Figure 14:
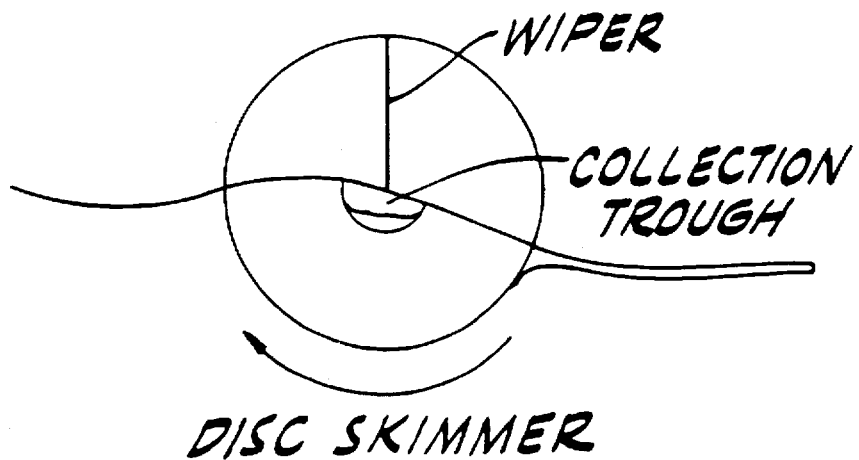
FIG. 14 depicts a prior art disc skimmer.
Figure 15:
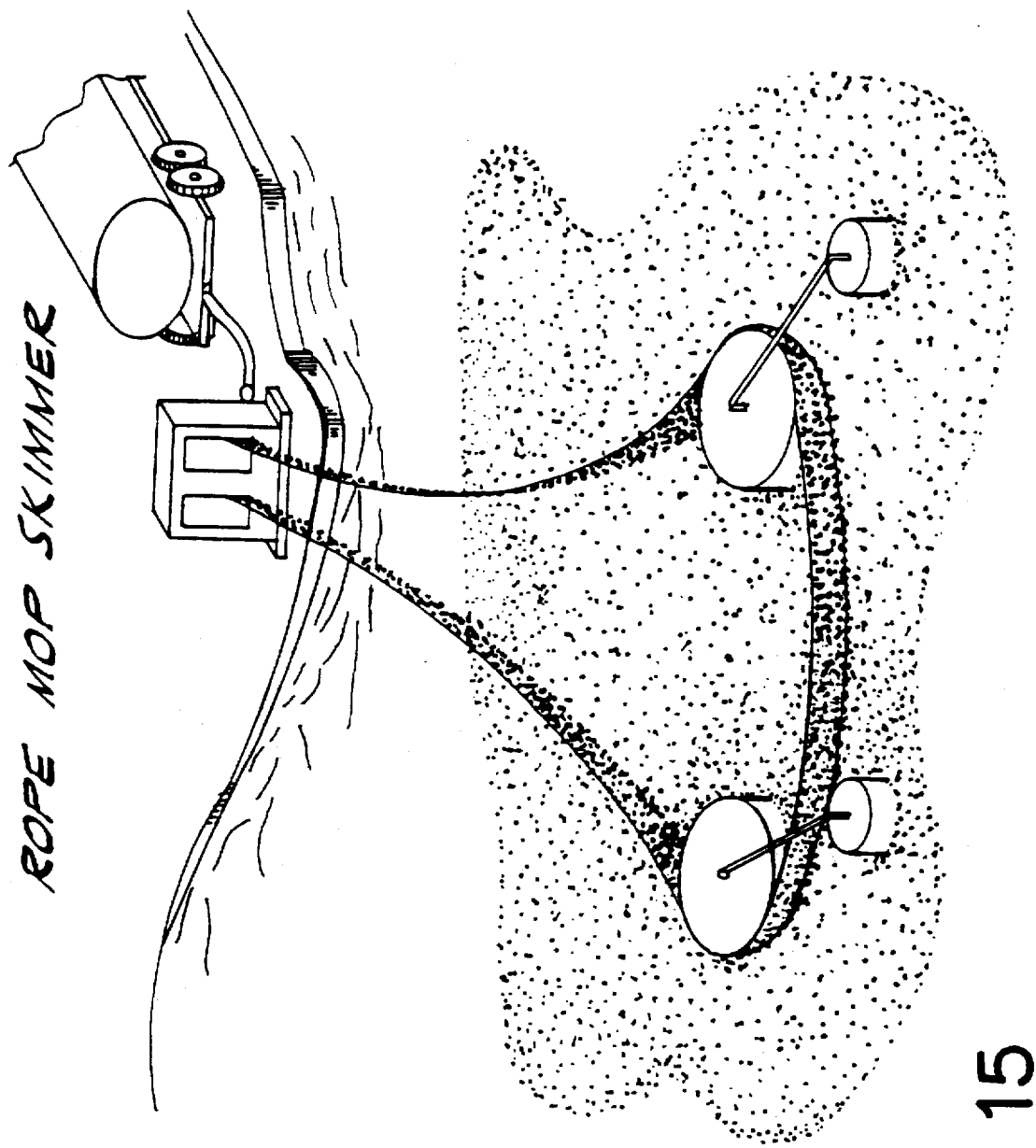
FIG. 15 depicts a prior art rope mop skimmer.
Figure 16:
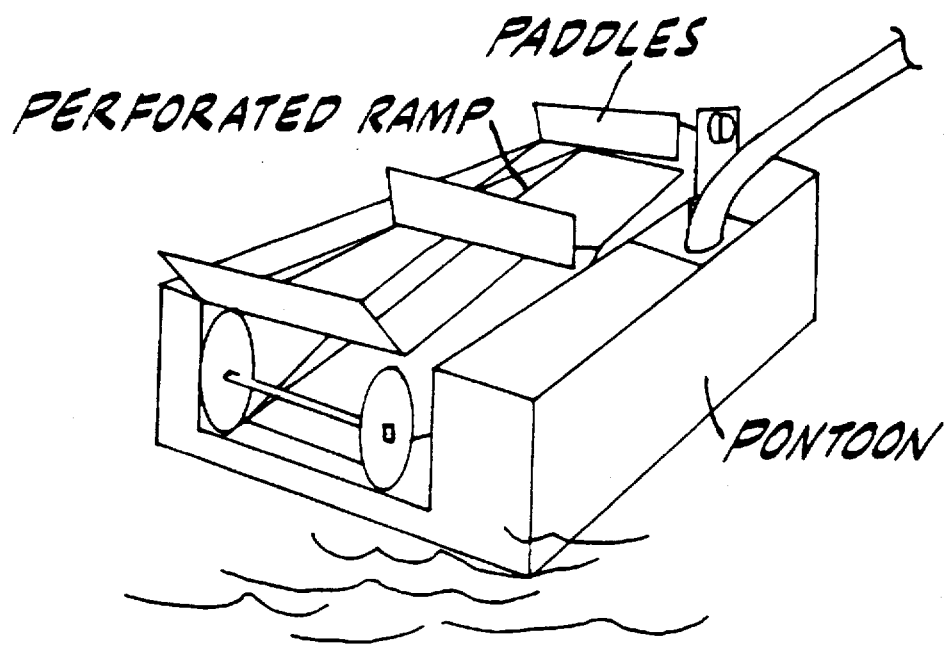
FIG. 16 depicts a prior art paddle belt skimmer.
Figure 18:
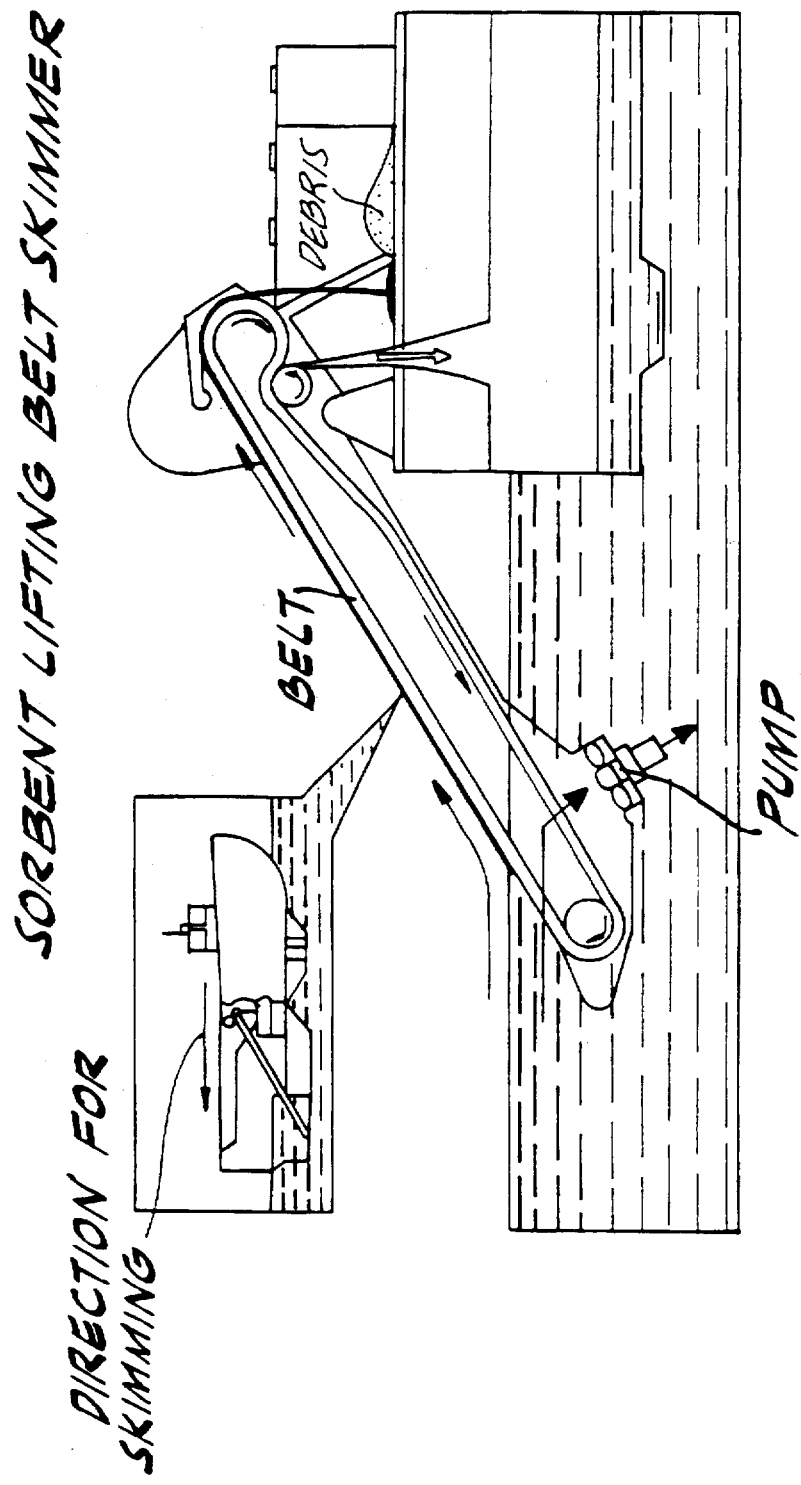
FIG. 18 depicts a prior art sorbent lifting belt skimmer.

As shown in FIG. 8B in a top view, another embodiment of the endless belt 39 is a material having "buckets" or pockets 41 throughout. These buckets 41 become filled with oil at the mouth 3 of the skimmer 38 and are then carried to the top of the conveyor and dumped or swept by a sweeper 40 into the collector 30. FIG. 8C depicts one of the bucket 41 in cross-section. The dotted lines 42 in FIG. 8C indicate the oil level in the bucket 41. Although each of the "buckets" contain a small quantity of oil, the movement of these "buckets" in concert with the large numbers of "buckets" result in the movement of a large amount of oil being carried up the main conveyer 2. As these "buckets" ride up the skimmer frame 1, their contents are emptied into the collection channel 30 by a sweep (a squeegee type sweep) 40 and with the help of gravity.

Figure 6:
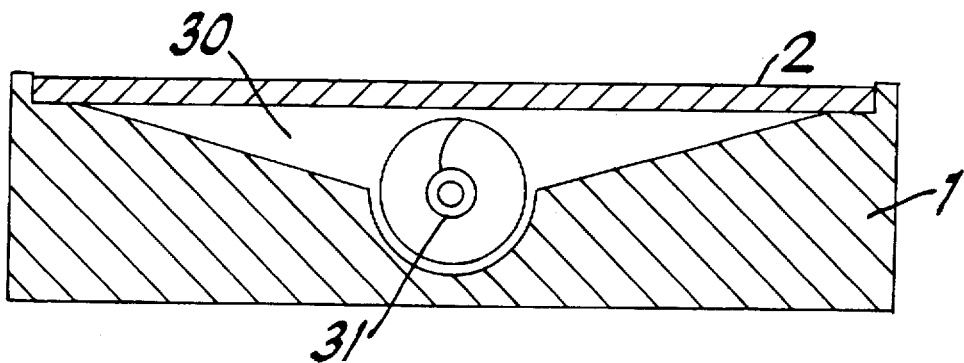
FIG. 6 depicts the oil recovery channel and auger type conveyor, section view.

The skimmer 38 is also optionally equipped with an auger type conveyor 31 located below the main conveyor 2 and built into a collection channel 30 in the main frame 1 of the skimmer 38. The augur conveyor 31 is shown more detail in FIGS. 6 and 7.

Figure 7:
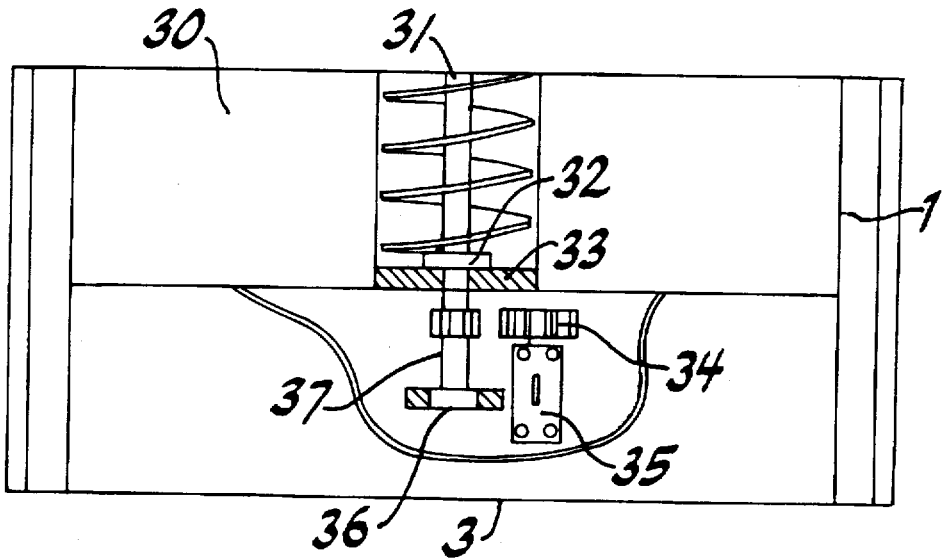
FIG. 7 depicts the oil recovery channel and auger type conveyor mechanism, top view.

As shown in FIG. 7, the auger conveyor 31 is disposed in a well of the collection channel 30 into which the oil drains from the main conveyor 2. The augur 31 is mounted on a shaft 37 having a sealed bearing 36 and drive 34 and is driven by an hydraulic motor 35. The auger is sealed in the collection channel 30 by a seal 32 and collar 33. The collection channel 30 and sump 5 are built into the main skimmer frame 1 to recover the material lifted from the water by the skimmer belt 2.

As the oil falls through the mesh of the endless belt 39, the oil drains from the main section of the collection channel 30 into the well section in which the auger 31 is located. The auger 31 then pushes the oil into the sump 5. The oil is then drained from the sump 5 via the drain lines 24 into storage on the vessel 21 (FIG. 4). The return pipes 24 are connected to a high volume pump (not shown) aboard the host vessel 21 to the storage container.

Figure 20A:
FIGS. 20A 20B depict the oil storage bag used in the present invention.
Figure 20B:
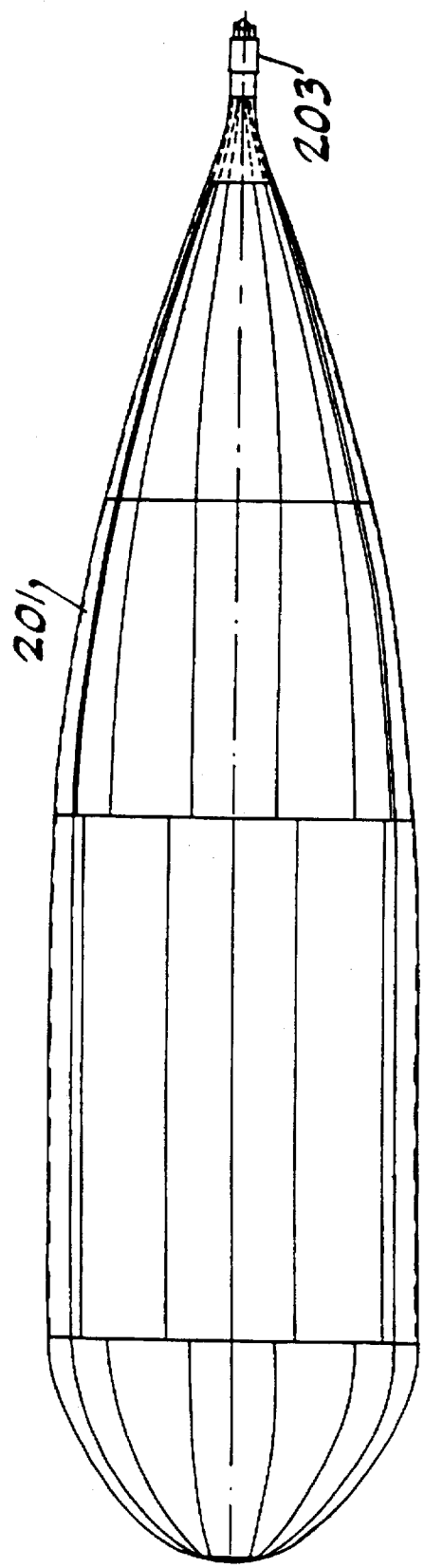
Figure 21:
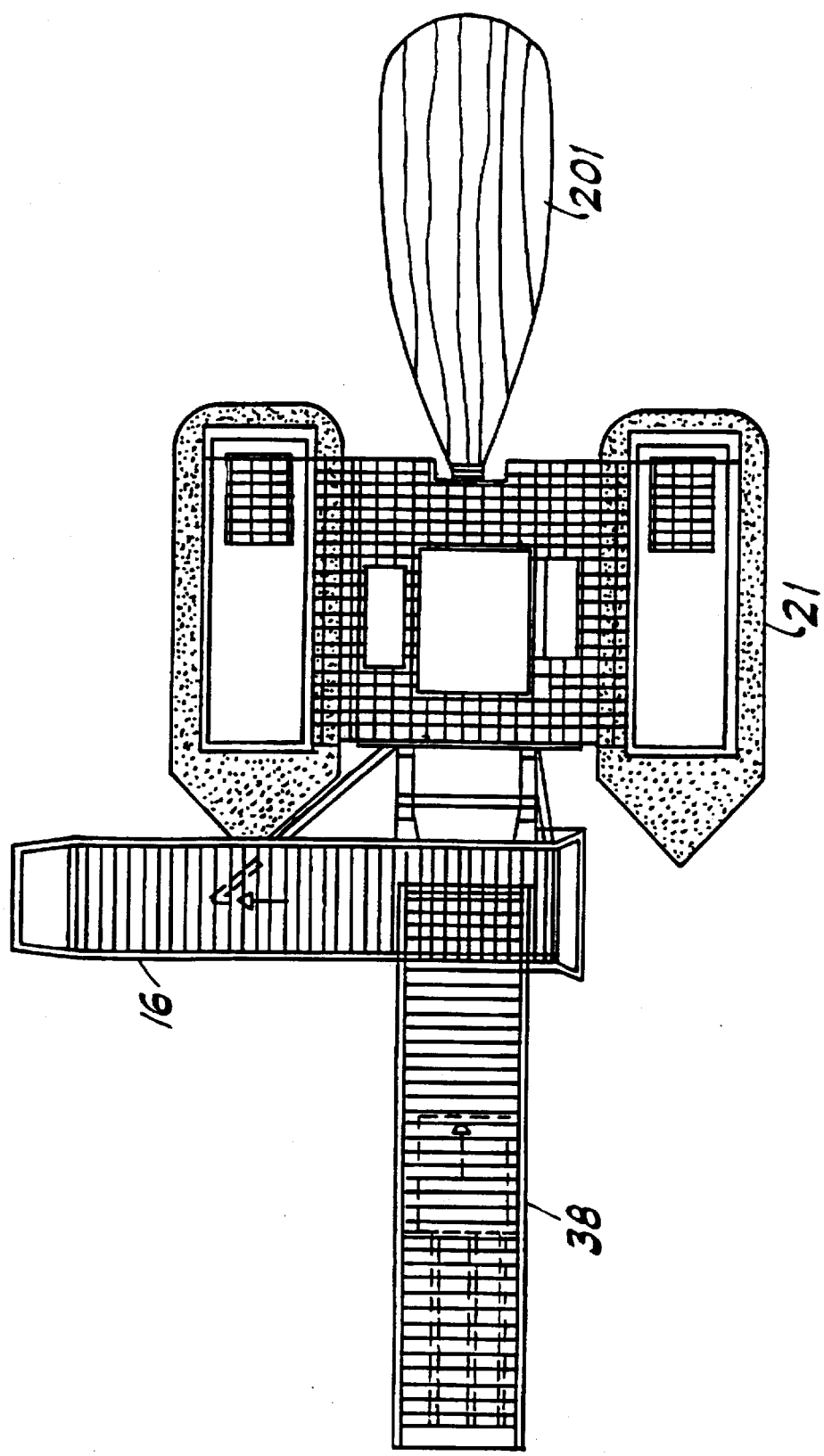
FIG. 21 depicts the utility vessel of the present invention outfitted with the oil recovery skimmer and the solid debris conveyor.

One possible embodiment of the storage container is an oil storage bag produced by UNITOR ENVIRO TEAM that can be filled and then towed to the TACTICAL STORAGE DEPOT or released by the host vessel 21 for later pickup when time is not of the essence. The present invention takes advantage of replaceable unlimited storage embodied in the UNITOR oil bag which can accommodate the great quantities of oil that can be recovered by the skimmer. FIG. 20 depicts one example of the UNITOR oil bag, which is the SP-920. These bags are available from UNITOR in several sizes, which range from 15,000 gallons to 125,000 gallons. The bag is very light yet can hold significant quantities of oil. The skin of the bag is made of a special fabric designed by UNITOR. The bag 201 includes a coupling 203 through which the oil is pumped into the bag, and out of which the oil is pumped when emptied.

Referring to FIG. 4, to accommodate solid debris which is likely to be encountered during skimming operations an optional transverse mounted conveyor 16 is mounted to the host vessel 21. The debris is dumped onto the transverse conveyor belt 18 by the main conveyor 2 and carried down the transverse conveyor 16 to a barge or other vessel via the down sloped discharge slide 19.

The present invention uses specially designed host vessels 21 employing state-of-the-art electronic, remote control, and global positioning systems and systems for hydraulic power, air pressure and pumping water that match the exact requirements of the skimmer 38.

Biaxial Mount

FIG. 2 depicts the skimmer 38 in side view as it is attached to the vessel 21. The augur conveyor 31 is not shown for the sake of clarity. To counteract the pitch and roll of the skimmer while traveling through choppy seas, the skimmer 38 is attached to the propelling vessel 21 (not shown) by means of a biaxial mount 43 (shown in detail in FIG. 3). The biaxial mount 43 at one end is mounted to the vessel 21 via a hinge mechanism 44. The hinge mechanism 44 includes a shaft 14 perpendicular to the center line of the vessel 21 and horizontal to the water line. The hinge mechanism 44 includes hinge plates 13 for mounting to the vessel via support 45. The hinge plates 13 are attached to the shaft 14 via sealed bearings 15. The hinge mechanism allows the nose section 3 (FIG. 1) of the skimmer 38 to travel in a vertical direction in concert with oncoming swells and waves.

Figure 3:
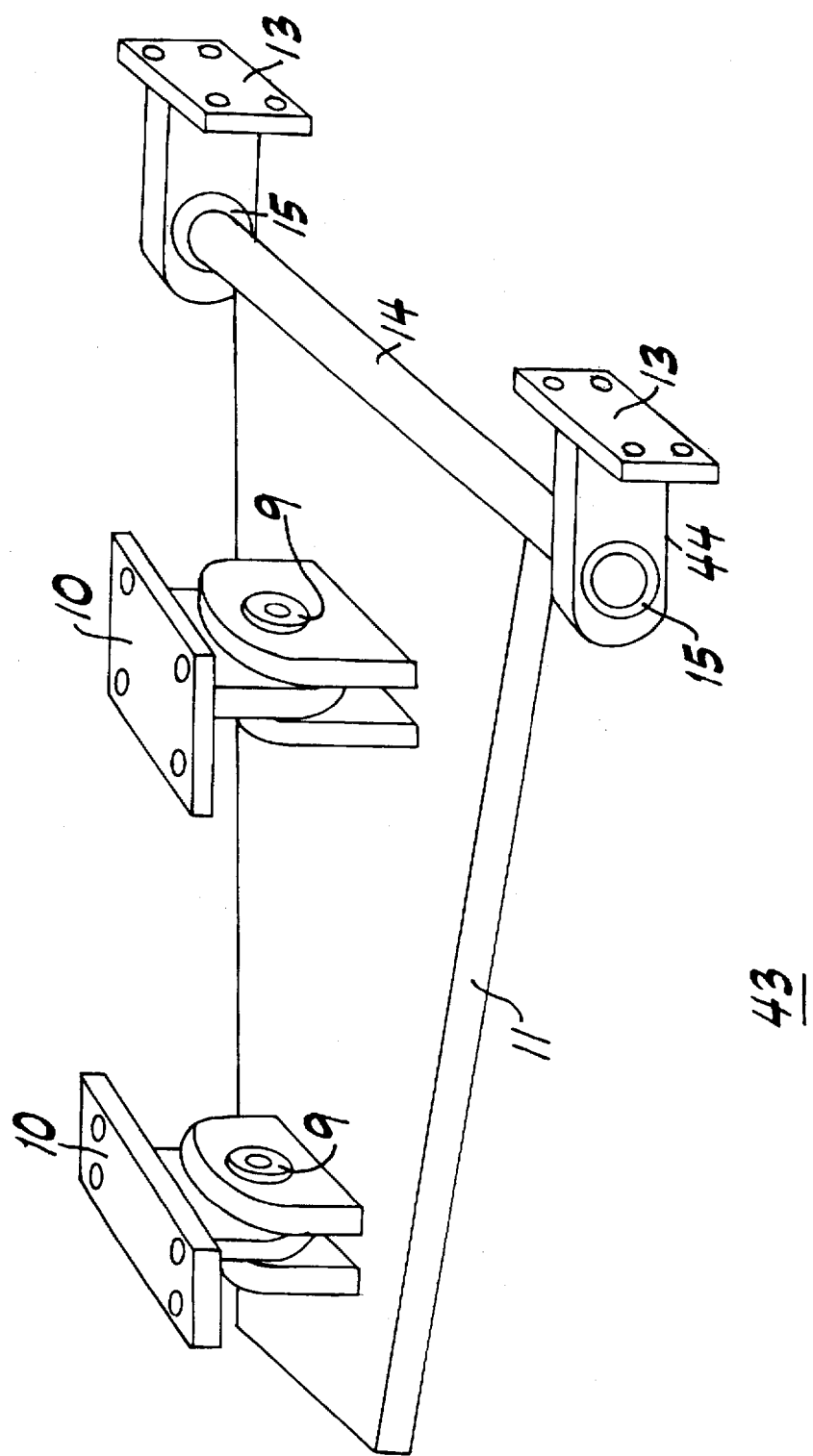
FIG. 3 depicts the biaxial mount of the skimmer according to the present invention.

As shown in more detail in FIG. 3, the main control frame 1 (FIG. 2) of the skimmer 38 is hinged perpendicularly to the vessel shaft yoke 11 by sealed bearings 9 and hinge plates 10 to allow the main frame 1 to roll in concert with cross waves and swells. This biaxial mounting 43 allows the nose of the skimmer 3 to remain at a fairly uniform depth in the water no matter which direction the waves are approaching. This allows the skimmer 38 to be attached to virtually any length or width of vessel 21 capable of accommodating the mass of the skimmer 38 without impairing the operation of the skimmer 38.

Ballast Controlled Flotation Pontoons

To allow the skimmer 38 to be pushed through the water at speeds sufficient to pick up large amounts of floating material without plowing too deeply, pontoons 8 are placed on both sides of the skimmer nose 3 to:

Hold the skimmer nose 3 at a proper depth while stationary; and

Hold the skimmer nose 3 at proper depth when moving forward.

The mouth 3 of the skimmer is maintained at the surface of the water by the pontoons 8, which are connected to the skimmer 38 via pivotal mounts 7 and attachment plates, which attach to the conveyer frame 1. The ballast of the pontoons 8 is controlled in a known manner, by compressed air lines 26, which are connected to an air compressor (not shown) located on the host vessel 21.

Figure 5:
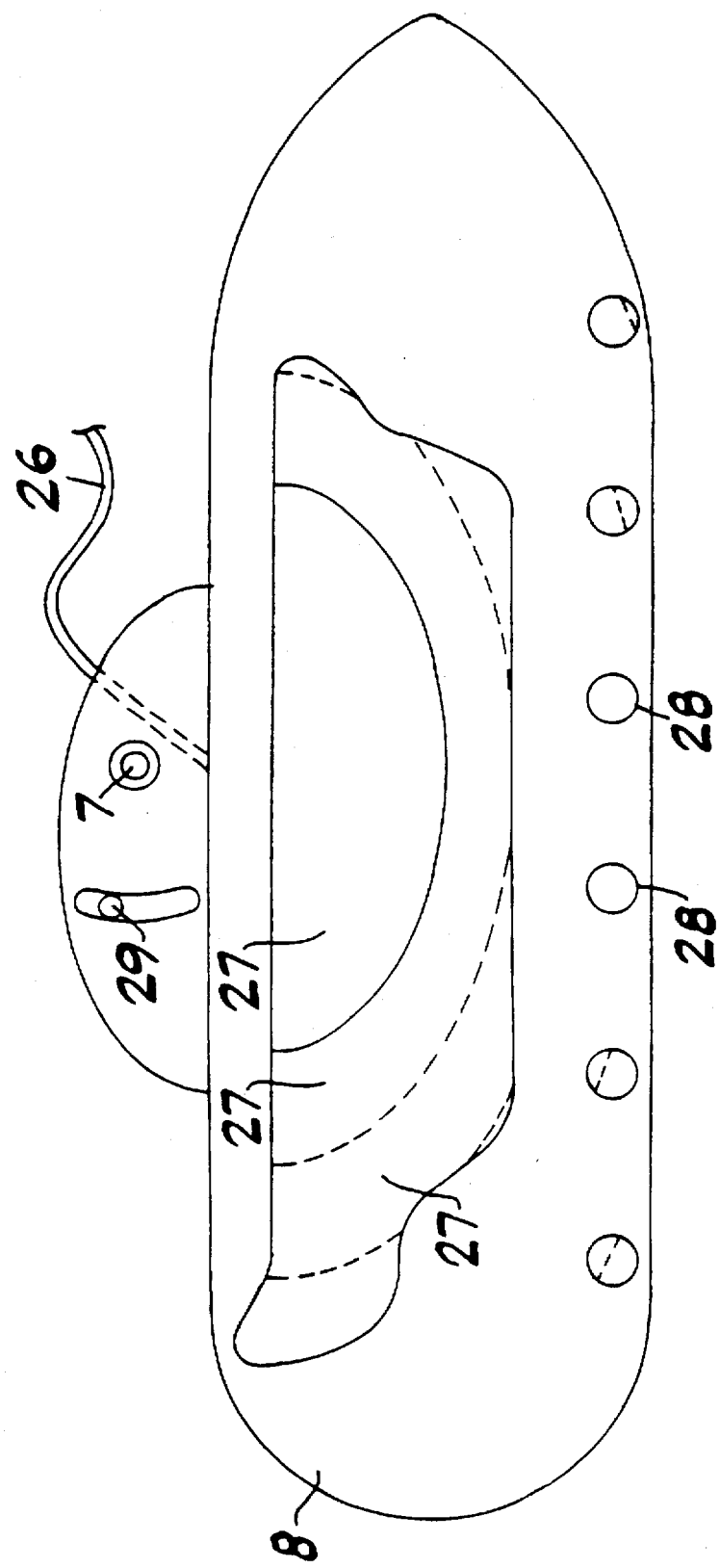
FIG. 5 depicts the variable ballast floatation pontoons, side view.

Referring to FIG. 5, the variation of the ballast in the floatation pontoons 8 is accomplished by varying the air pressure in the bladder 27 inside the pontoons 8 in a known manner and controlled by compressed air such as is used in submarine technology. The floatation level is increased by adding air pressure to the bladder 27 thus forcing the water out of the pontoons 8 through the vents 28 in the bottom of the pontoons 8. The floatation is decreased by bleeding the air pressure in the bladder 27 and the action caused by the weight of the skimmer 38 to force the water into the pontoons 8. The compressed air is supplied through air pressure lines 26 connected to a compressed air system aboard the host vessel.

The pontoons 8 are hinged by the swivel mount 7 (see also FIG. 1) so as to pivot and stay in concert with the waves and swells to maintain a uniform depth for the skimmer nose 3. A pivot limit 29 with an hydraulically controlled lock pin limits the angular travel of the pontoon 8.

The present invention has been described for use in an oil spill recovery system. It is also applicable for small floating debris or algae floating on the surface of a body of water. By using the skimmer disclosed herein, it is possible to clean up lakes that are "polluted" by algae.

The present invention can be operated with vessels of opportunity when properly mounted, if the vessel can supply the required water, hydraulic power, compressed air system and pumps. The present invention can work with other oil spill clean up technologies, taking into account their limitations as described earlier, however, the present invention has been designed to perform at its optimum effectiveness when used as an integral component of a complete oil recovery system.

Figure 22:
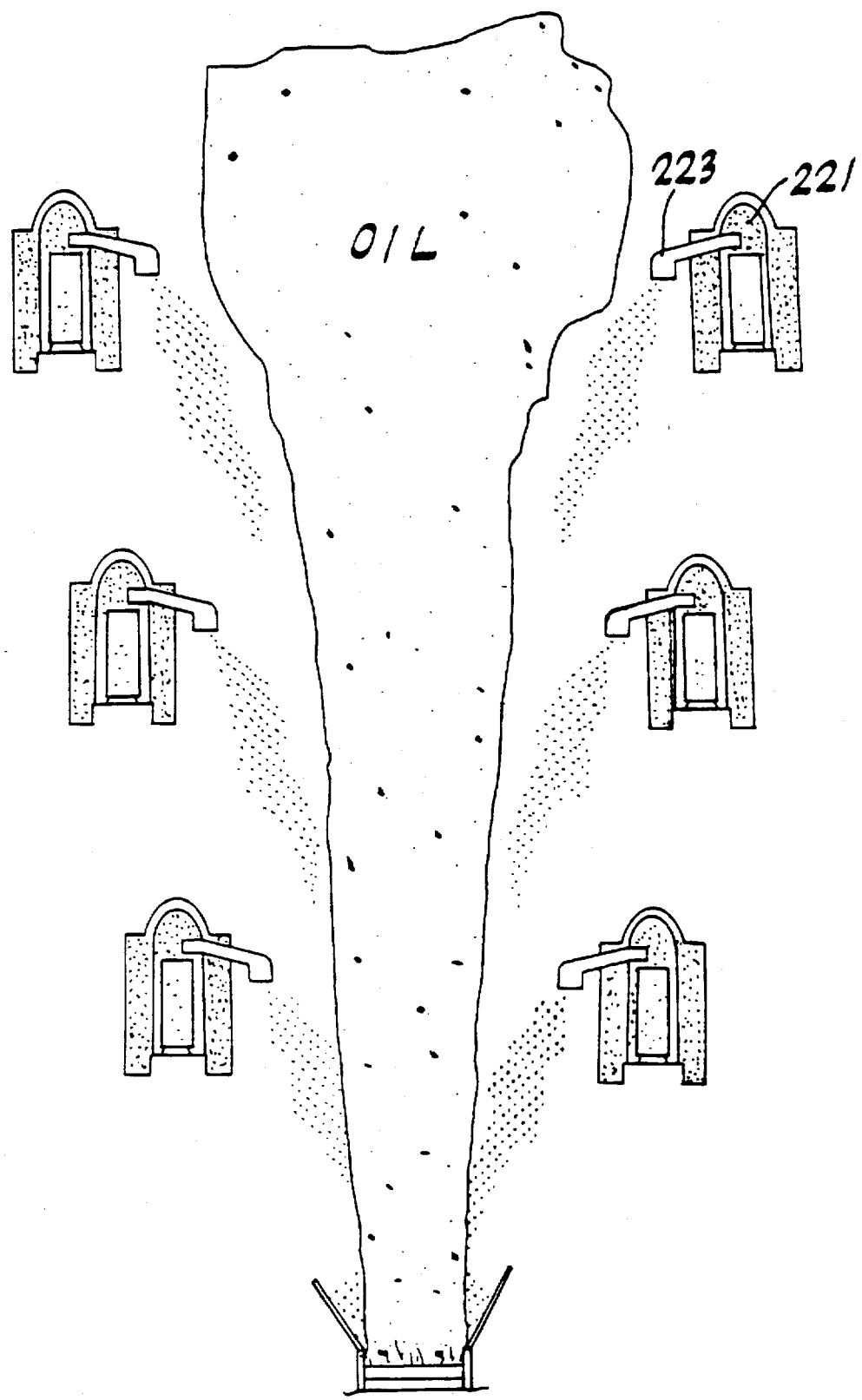
FIG. 22 depicts the remote response vessels herding the oil towards the skimmer according to the present invention.

First, the present invention takes advantage of the remote response vessels 221 to keep the oil from spreading and direct the oil towards the skimmers 38. Referring to FIG. 22, the remote response vessels 221 are specially designed to include plunging water jets 223 and are operated in a formation ahead of the skimmer 38 to concentrate and direct oil floating on the surface of the water into the mouth of the skimmer 38. Several remote response vessels are used to direct the oil into one skimmer 38.

Figure 23:
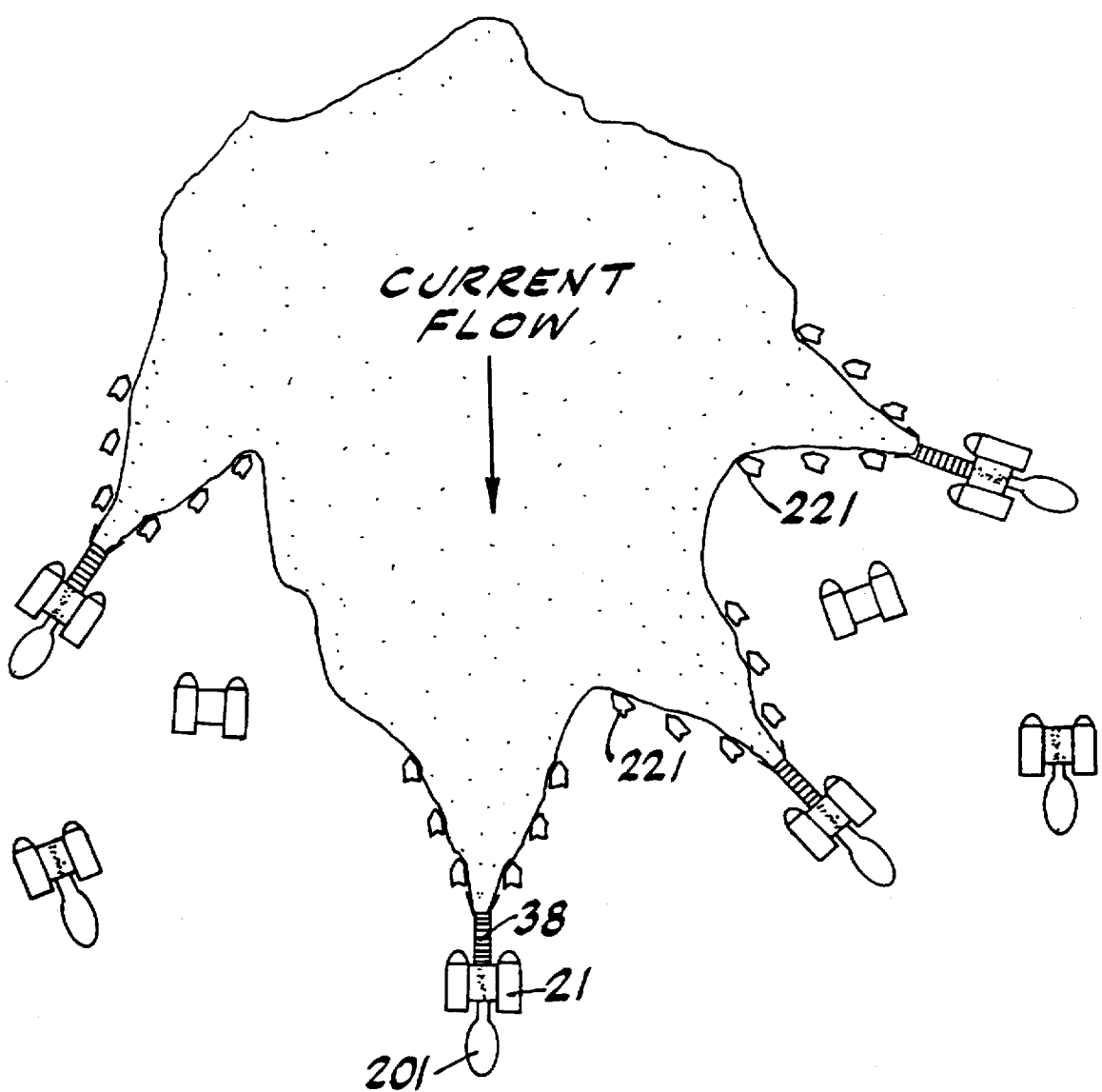
FIG. 23 depicts the entire formation according to the present invention for recovering an oil spill.

FIG. 23 depicts the whole formation according to the present invention to contain and clean up a large oil spill. Several remote response vessels 221 are used in front of each skimmer 38 on the host vessel 21 to direct the oil towards these skimmers 38. Several host vessels 21, each of which are outfitted with a skimmer 38 are needed to recover the oil. As these host vessels recover the oil, the is oil pumped into a small oil bag 201 (15,000 gallon capacity) attached to the host vessel 21 floating behind the host vessel 21.

As the small oil bags 201 fill, the host vessels 21 return to the tactical storage depot 231 (shown in more detail in FIG. 24), and empty the contents of the small bags 201 into the large oil recovery bags 233, which are on the order of 125,000 gallons.

Figure 24:
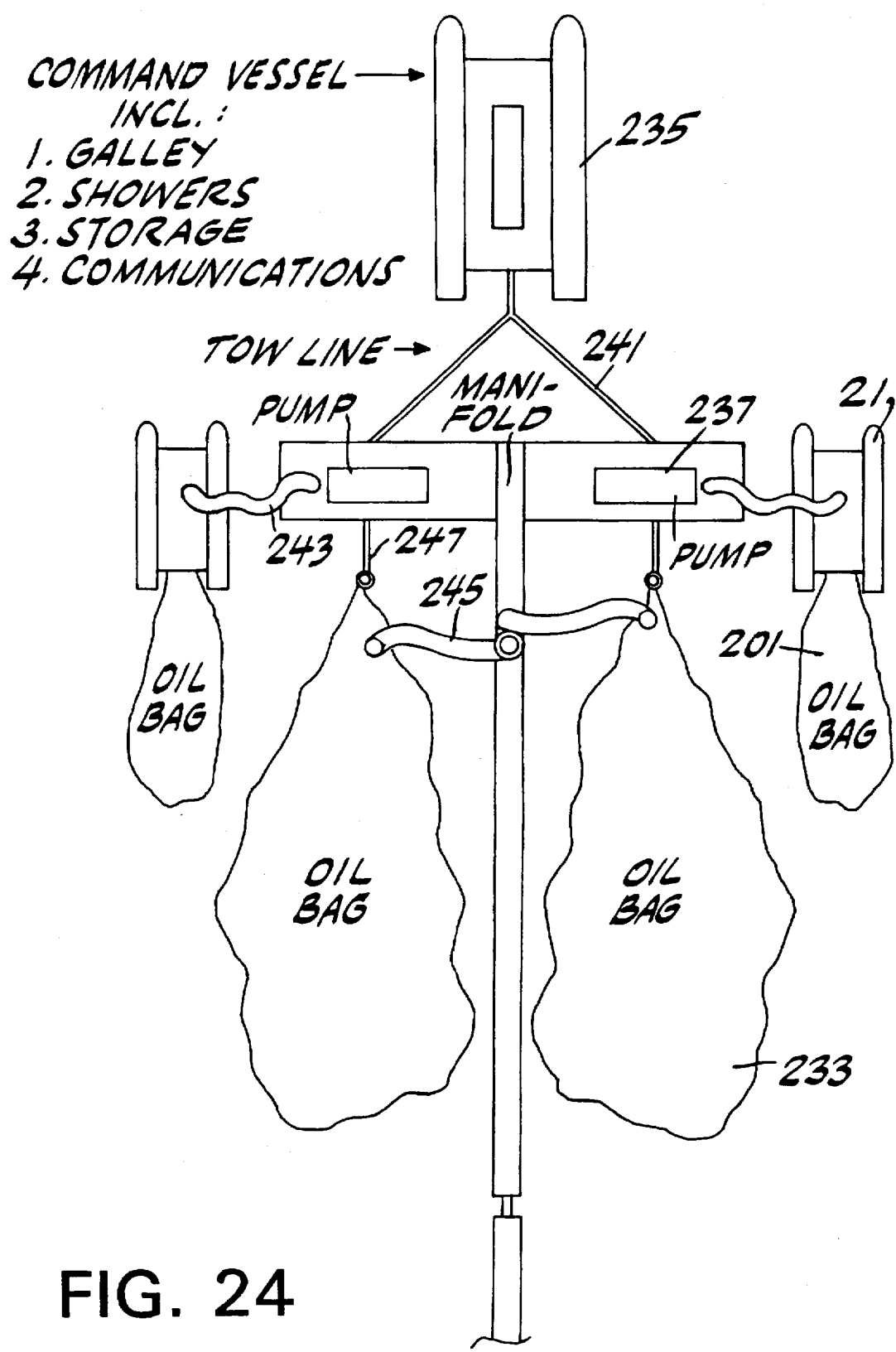
FIG. 24 depicts in detail the tactical storage depot according to the present invention.
Figure 25:
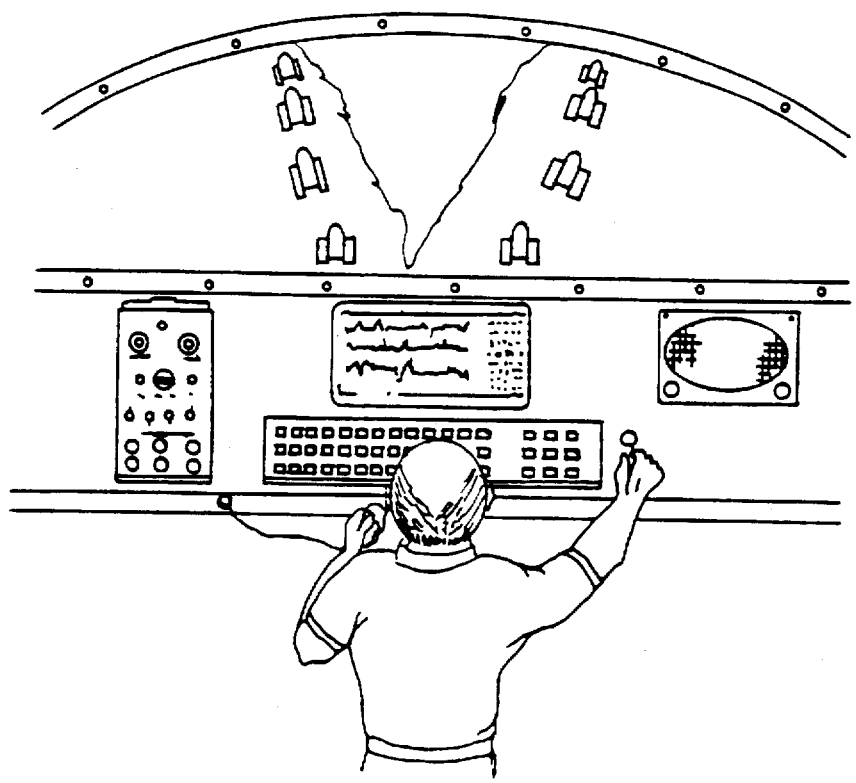
FIGS. 25 and 26 depict the observer stations on board the command vessel according to the present invention.
Figure 26:
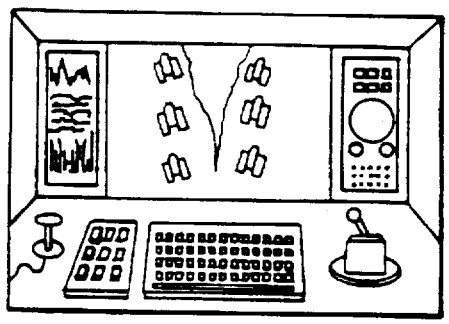

Referring to FIG. 24, pumps 237 on the tactical storage depot 231 pump oil from the host vessel 21 bag 201 through lines 243 into the large bags 233 via lines 245. The tactical storage depot consists of a command vessel 235, which tows the pump assembly via tow lines 241. The large bags 233 are about 37 meters in length and 8.7 meters in width. The command vessel includes a galley, showers storage and communications. The large bags are attached to the pump assembly via lines 247. FIGS. 25 and 26 depict the observer stations aboard the command vessel 235. The commander of the oil recovery operation directed the host vessels 21 and the remote response vessels using the observer station shown in FIGS. 25 and 26.

The combination of the utility vessels 21 and the tactical storage depots 231 creates an oil recovery operation that can operate as a seamless integrated system, which is capable of performing in an uninterrupted, continuous manner in fog, darkness and adverse sea conditions.

SPILL RESPONSE AND RECOVERY SYSTEM

The above-mentioned skimmer is a key ingredient of an overall system for responding to an oil spill. The four main categories of oil spill clean up efforts are response, containment, recovery and storage.

Response

Response time is a function of many factors, not the least of which is advance preparation and coordination with responsible agencies and contractors. Proximity to the spill site is a foremost consideration, with the means and travel times central to that issue. The readiness of equipment and availability of trained crews is essential, as well as the methods of swift coordination of resources. The present invention minimizes the response time by providing an integrated and coordinated system which can be easily shipped and unpacked quickly on site.

Transportation

Figure 27:
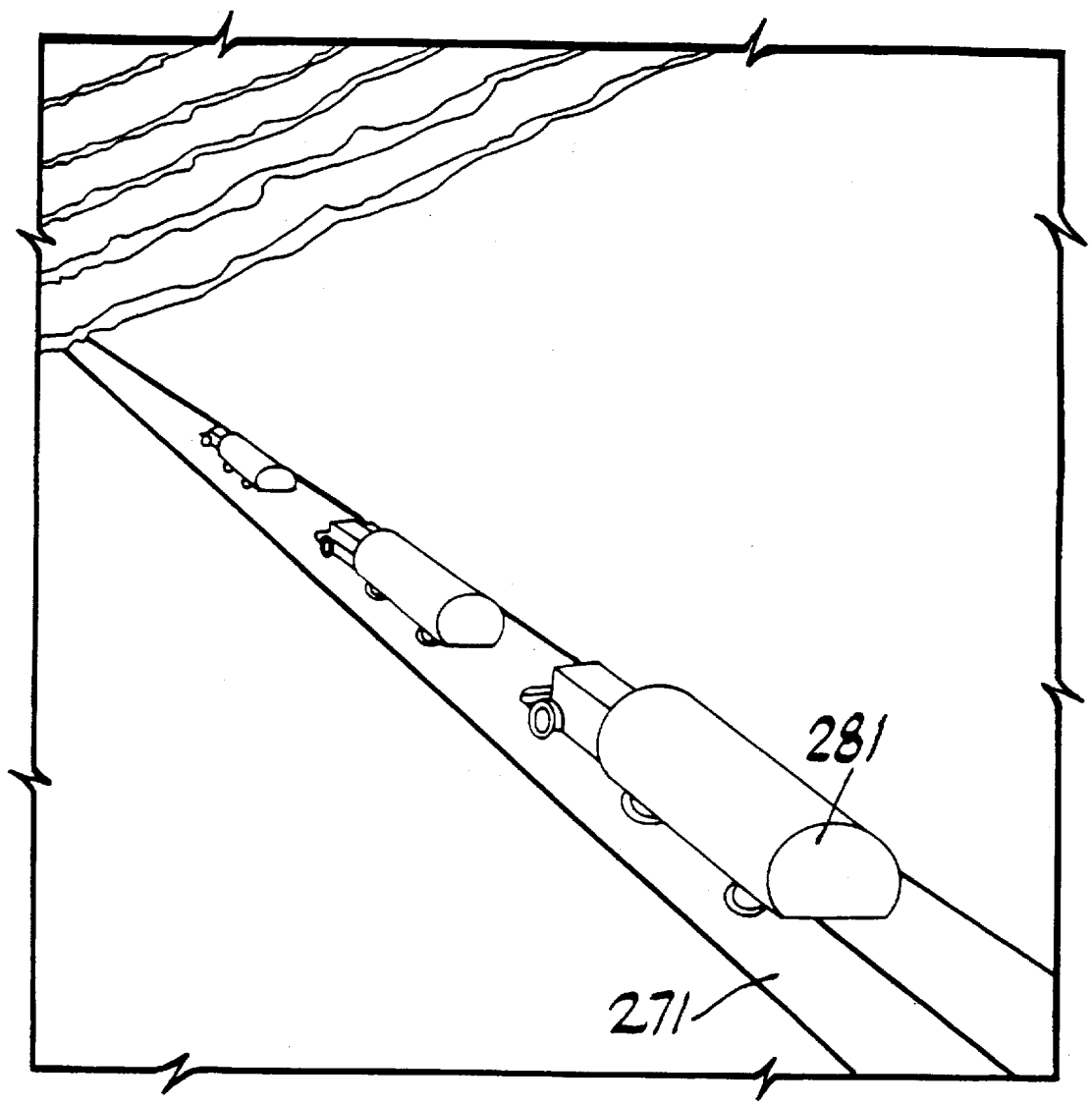
FIG. 27 depicts the storage container of the present invention being transported over the road by trucks.
Figure 28:
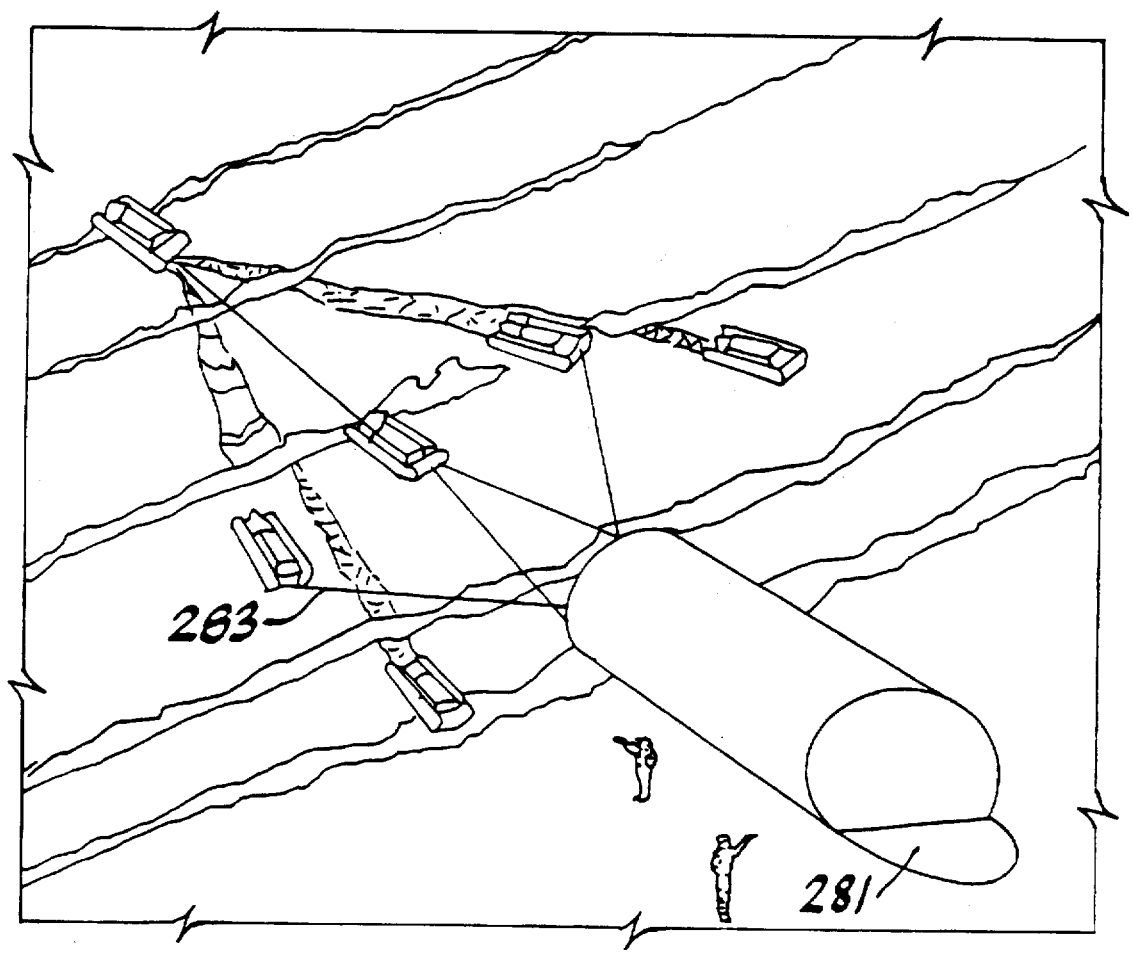
FIG. 28 depicts a beach deployment of the equipment according to the present invention.

A major consideration will always be the logistics of moving equipment to a spill. The present invention includes prepackaged response packs that can be moved easily by truck FIG. 27, air, helicopter or on water. Launching from beaches may be necessary in certain scenarios. FIG. 28 shows one such deployment from the beach using the storage container 281 of the present invention and specially designed inflatable "runways" 271 (not shown) will be used to assist in launching over uneven terrain or sandy beaches. These "runways" will be rolled up and stored in specially designed shipping containers 281 (which are described below). Deploying from shore side or shipboard facilities will be far less complicated and far more efficient than existing technologies allow.

Many locations are difficult to reach from land, and sea travel time may take many hours. The vessels of the present invention are designed to travel on water at forty knots, to arrive at the spill site in a timely manner. The shipping container 281 of the present invention is designed to be trailered on standard frames for transportation over the road, as shown in FIG. 27. The design of the present invention includes light weight components capable of air or helicopter transport. In addition, the first strike components, Remote Response Vessels (RRVs), utility vessels, oil skimmers, shipping containers and Unitor oil bags can actually be airdropped using parachutes to remote or inaccessible spill sites. Even if a spill is no immediate threat to a shoreline, the salvage operation could recover valuable energy resources. Also of importance, spills have been known to change direction of travel and surprise the would-be responders.

Figure 30:
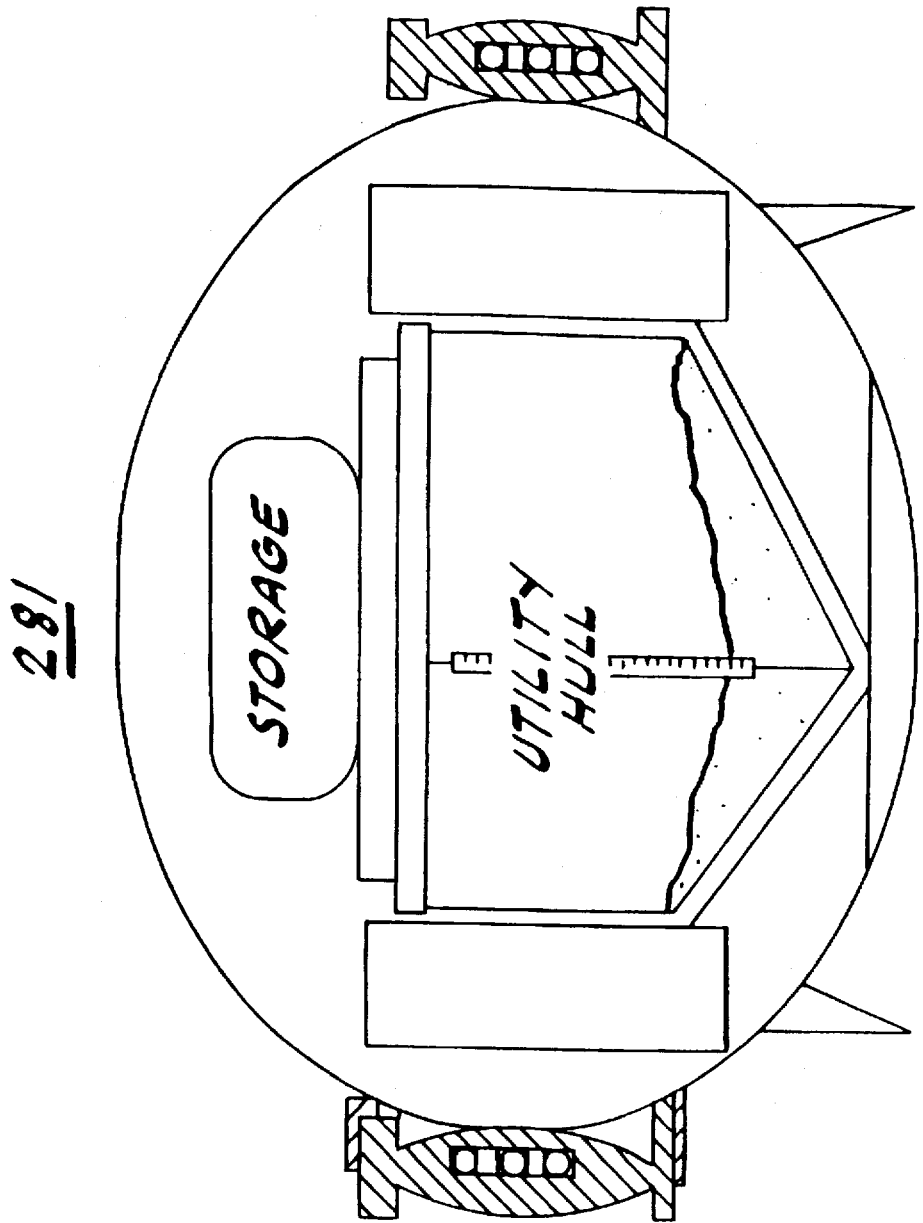
FIGS. 30 and 31 depict the storage container of the present invention in detail.
Figure 31:
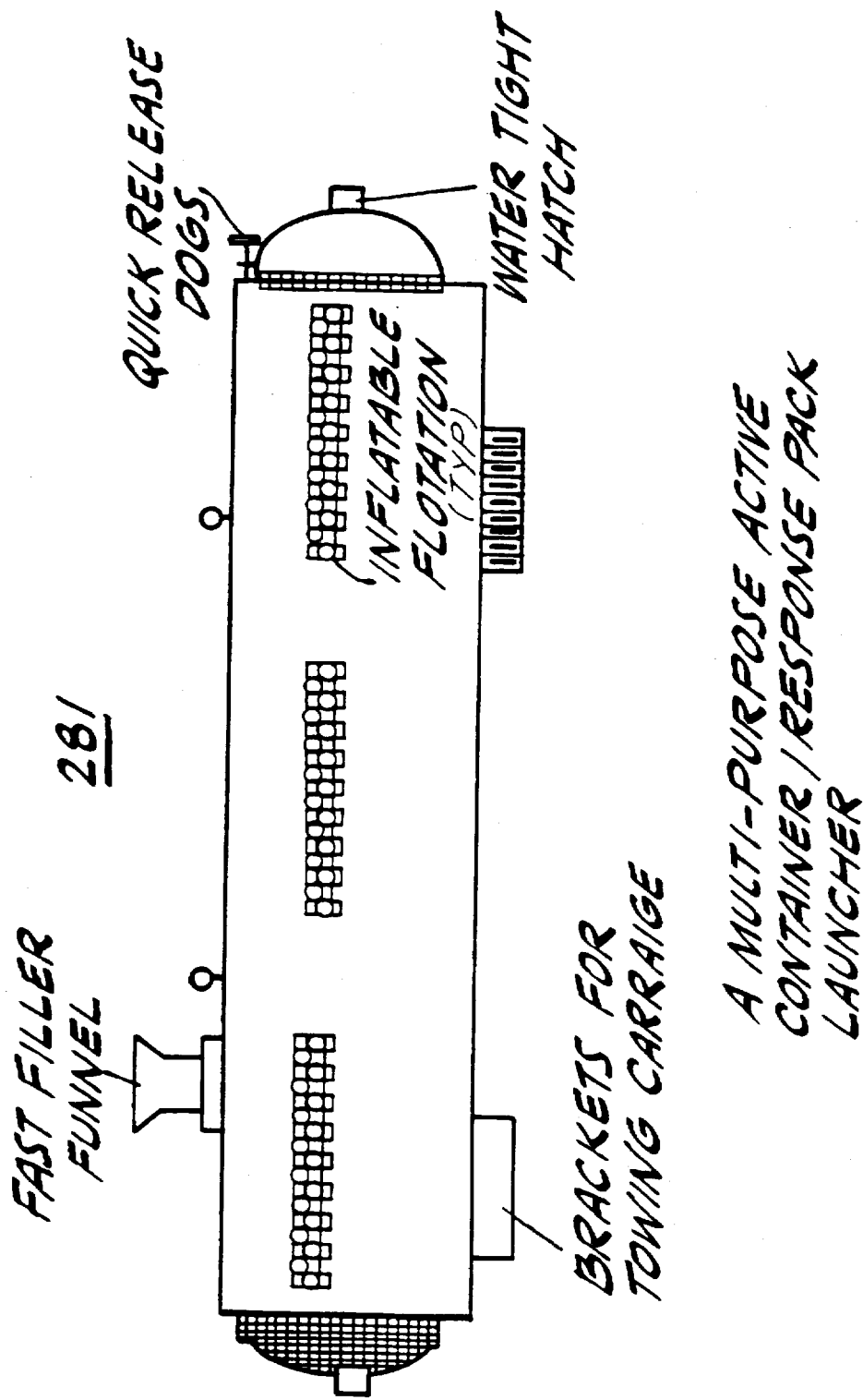

FIG. 30 depicts the storage container 281 of the present invention with one of the utility vessels 21 stored within. FIG. 31 depicts the storage container 281 in section, when empty. In this case, the same storage container can be used to store recovered oil.

Rapid Assembly and Deployment

The concepts of prepacking components and inflatable technology, can lead to very fast assembly. The components themselves are designed with fast response in mind, which means minimal assembly time. Crews can easily practice optimizing deployment.

The present invention has designed inflatable runways 271 for fast deployment on rocky or sandy beaches. One complete ocean response system is deployable in a few hours from arrival at most launch sites.

Containment

Containment is the process of halting the spread of oil spills. Preventing the oil from spreading to an unmanageable size is essential to actually recovering the oil.

P-Jet

To achieve a substantial increase in spill protection, the system of the present invention expands around the Plunging Water Jet (P-JET) and its capabilities, which have been demonstrated to be far superior to existing techniques. Oil booms have been the standard tool of the industry. The present invention includes new tactics based on the characteristics of the P-JET.

A P-JET is a high pressure, high volume, water nozzle producing a convergent stream of water which creates a uniquely persistent wave and current. The P-JET is a controllable oil barrier as shown in U.S. Pat. No. 4,425,240, the disclosure of which is hereby incorporated by reference in its entirety. A virtual oil boom is created by the nature of the wakes and currents developed while moving through the water. This technology allows the containment and manipulation of oil spills in ocean conditions.

P-JETS, mounted on Remote Response Vessels (RRVs) in formation (see FIGS. 22 and 23), allow the surrounding, deflecting, shaping and containment of oil and floating substances while in motion at up to six knots. P-JET tactics include operation in sea and current conditions beyond that of boom containment methods and are not limited by the length of oil booms. The primary problem with oil boom technology, from which the P-JET does not suffer, is its inherent ability to be easily overwhelmed by relatively minor wind and water velocities.

Additionally, the system of the present invention is no limited by the storage, transportation and handling of heavy and cumbersome oil booms, allowing a much quicker deployment and reaction to a spill.

Remote Response Vessel (RRV)

The remote pilot response boat 221 is designed to be used in several modes of operation. It can be operated with a pilot on board, for use as a general purpose utility craft, or piloted remotely from a command center to include: oil containment operations, bioremediation and dispersant distribution, absorbent broadcasting and fire fighting in dangerous conditions.

Synchronous remote control from the command utility vessel 235 enables complicated maneuvers in Oil Deflection Formations (ODF). These are groups of RRVs 221 requiring precision course, interval spacing, angle vector maintenance and speed, to form moveable barriers which direct the flow of oil into the skimmer and keep the oil from reaching environmentally sensitive shores or beaches.

A remote control mechanism for aiming nozzles is used for fire fighting. Television cameras transmitting to the command center provide visual control of the operation. The RRV also contains a self quenching system to spray itself for cooling and sensors to alarm its upper limits.

The UNITOR OIL BAG is also adaptable to carry fire foam to be applied through foam nozzles. This creates a new degree of waterfront and oil spill fire fighting by allowing closer proximity.

Absorbent and bio-remediation agents can be delivered efficiently around the clock. Again, the UNITOR OIL BAG can be used to supply large quantities of the agent.

The RRV 221 is a Catamaran type with a work deck and a high speed inflation system to prevent roll over and submersion. It is nineteen feet long with aluminum HEX-CEL (Honeycomb) used in the hulls. Power is supplied by air-cooled diesel engines coupled to custom designed jet pump propulsion drives. Additional air-cooled diesel engines supply power to specially designed pumping systems. These systems deliver water to bow and stern thrusters. A pump and manifold 223 supply water to the P-JETS, bioremediation material delivery nozzles and fire fighting systems.

This arrangement allows light weight with acceptable reliability and endurance. The RRVs 221 are designed to withstand rollovers, temporary submersion, high waves and surf conditions. The inflatable floatation system also provides protection for the hulls when packed inside the shipping container of the present invention.

Remote pilot controls simulate the characteristics of boat handling by an experienced operator in various sea conditions. The black box control using a dedicated computer enables these operations.

Absorbents

New absorbents have been developed for use in the clean up arena. This material can be broadcast by RRVs 221 and supplied by small UNITOR OIL BAGS 201 attached to the work deck aft. The oil soaked absorbent is then recovered by the skimmer 38 and transferred to oil/absorbent separation equipment. This technique is particularly useful on harbor spills. Absorbents may be the only effective method of protection around pilings, rocks, or in heavy surf conditions.

Recovery

Recovery is the process of recovering the spilled contaminate.

Utility Vessel

The 21 UTILITY VESSEL is a catamaran arrangement with both hulls constructed of aluminum HEXCEL. It will include a high speed inflatable floatation system attached to the hull. It is powered by air-cooled diesel engines coupled to jet pump propulsion drives. These vessels are also designed to make forty knots. Additional air-cooled diesel engines supply power to a variety of hydraulic systems mounted on the main deck. Each deck is constructed to meet the demands of its assigned task.

Command Utility Vessel

The main deck of this vessel 235 accommodates the skimmer 38 of the present invention, which is mounted on the bow and connected to the hydraulic system. It is also equipped with P-JETS for the final herding of the oil into the mouth of the skimmer. This deck contains the command and control of the RRVs 221 and serves as the communications center for the operation. The two hulls provide crews quarters for operations of long duration.

The recovered oil and water are pumped to hydraulically driven oil-water separators and pumped to UNITOR OIL TRANSFER BAGS 201 mounted to the stern for transfer to the Tactical Storage Depot (TSD) 231.

Electronics Package

This vessel also contains a specially designed electronics package to include GPS (Global Positioning System). GPS is a technology used to accurately locate a given position using a system of coordinated satellites. A new application of this technology is called "SLIKTRAK", which is manufactured by Trimble Navigation of Sunnyvale, Calif. SLIKTRAK can locate and track an oil spill, day or night, in good or bad weather, or all conditions of low visibility. Trimble Navigation has designed an electronic remote controlled system around the capabilities of SLIKTRAK. Radio telemetry with the command center control each RRV's 221 relative position and operation. Positions of each vessel 221 are transmitted to the command computer which also sends operational signals through a joystick.

Computer Control System

A process computer package accomplishing the above mentioned goals has been developed using software designed by Trimble Navigation and readily available computers. The system includes: digital signal processing, communications, process control, robotics, coded telemetry, transducers, instruments, graphics, joystick control, black box devices, interfacing with marc, cameo, ncaa and international codes, system history, record keeping capabilities and GPS tracking.

Communication Systems

Existing communications can be awkward in large scale emergency operations. Hand-held radios and VHF are slow methods of communication. The design of the present invention reduces the need for routine voice communication by utilizing a computer linked graphics display transferring data and control functions automatically. The voice commands may then be limited to observed changes and anomalies.

High security communications also serve to thwart terrorist intervention. Record keeping becomes part of the operation automatically, with all desired data transmitted to any chosen location for printing, storage and analysis.

Sensors

Sensors detect direction, speed, engine statistics, depth, wind, wave data and other pertinent information. Sensors also detect and identify toxic and explosive mixtures rapidly and safely. Reconnaissance actions conducted by remote controlled RRVs will protect humans by isolating them from danger.

Silktrak

SLIKTRAK is used in the system of the present invention to detect the presence and direction of flow of oil floating on the water. Twenty four hours a day and in low visibility conditions, the SLIKTRAK signal is used to guide the RRVs in the direction of the flow of the floating oil.

Video

Video cameras aboard the RRVs provide visual control to locate the movement of a spill during daylight operations. They also provide video documentation of the containment operation.

Storage

What do we do with the oil now that we have recovered it? This has been one of the most perplexing problems facing the industry since oil spills became big news. The slowness of the clean up process and the lack of adequate storage capacity in the past, reduced the value of the recovered product due to evaporation and "weathering" of the oil. All that was left was hazardous waste.

Environmental regulations covering hazardous waste disposal have significantly increased the cost of locating and utilizing approved dump sites. Indeed, the concept of the present invention of fast response and recovery can provide a product that is still refinable, thereby eliminating the added costs of transportation and hazardous waste disposal, as well as the retention of some measure of the original investment.

Transport Utility Vessel

Once again, these versatile vessels 235 play another important role in the operation. The decks on these vessels 235 are equipped with handling apparatus for use in the connection and transfer of the 15,000 gallon oil storage bags from the skimmer vessel 21 to the Tactical Storage Depot 231. Four of these vessels 235 will be needed in a major ocean spill and will carry additional empty storage bags. The proximity of the TSD 231 will be determined by existing conditions at a given spill scenario. It might be necessary to temporarily cast some of the filled oil bags 201 adrift, or they may be sea anchored and flagged for subsequent transfer to the TSD 231.

Tactical Storage Depot (TSD)

The Tactical Storage Depot 231 is the final link in the system of the present invention. Its purpose is to safely store spilled oil that has been recovered. The oil is subsequently transferred to a tanker or oil barge for shipment to a refinery or storage facility. This part of the system addresses two main concerns of the oil recovery effort: a place to temporarily store the oil in a safe and secure manner. The TSD 231 consists of the following components: One TSD shipping container of the present invention, which is equipped with oil-water separators, pumps, hoses, connections, a work deck and anchor system.

One Oil Transfer Manifold (OTM) is a specially designed system of piping and connections for the safe transfer of oil to the 130,000 gallon storage bags. It also serves to remove the decanted water from the bags and eventually the safe transfer of recovered oil to a tanker.

Two 130,000 Gallon UNITOR OIL BAGS 233 are used for the storage of recovered oil. These bags are equipped with a decanting system which will serve as the final stage of oil-water separation.

Shipping Container

Figure 29:
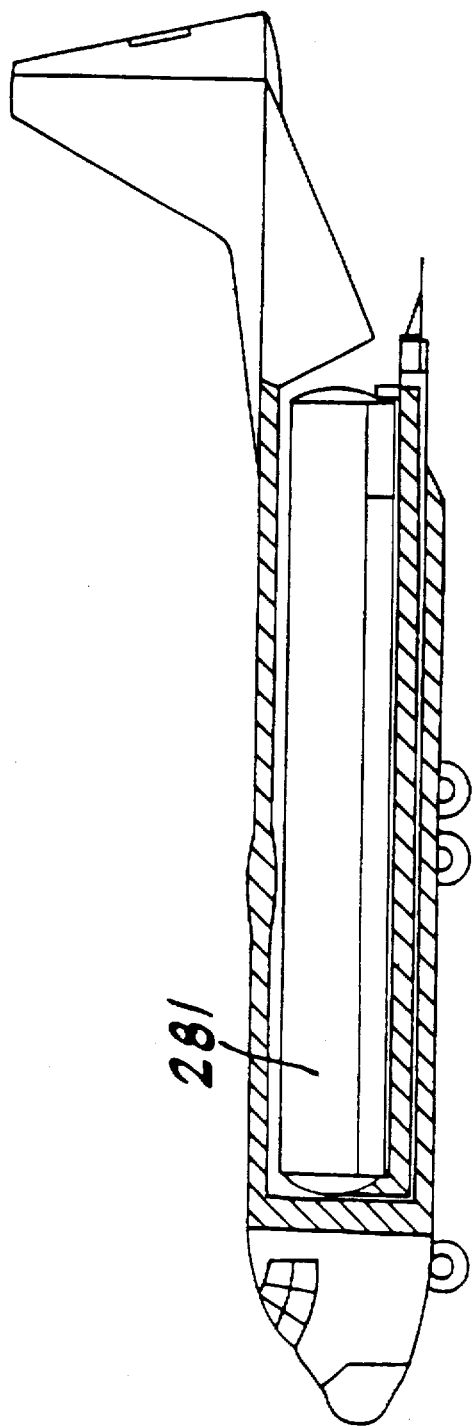
FIG. 29 depicts the storage container of the present invention as carried in a cargo plane.

The shipping container 281 is a rigid, floating container, which combines the functions of transporting rapidly deployable response equipment packed in a can. The hull, or fuselage, is constructed of aluminum sheet over HEXCEL material. The design size is set at 38 feet long and 8' 9" diameter. This size will fit into air cargo transports (see FIG. 29). This hull also includes high speed inflation systems mounted to the hull for stability in ocean environments. The hydrodynamics of the shipping container 281 allow a top speed of more than twelve knots by using a combination of hydrofoil fins and Yukon inflatable floatation. The propulsion and auxiliary power is supplied by a utility vessel 21. Some components of the system of the present invention are packed inside specially designated cans 281 of the present invention using the integral inflatable flotation tubes 283 attached to each hull. The tubes are partially inflated to hold the equipment in place during transportation, eliminating tie-downs and minimizing unloading time. The container 281 of the present invention can be used in a variety of applications: transport packs, fuel tankers for operational vessels, crew quarters, parts and equipment storage and the tactical storage depot.

Headquarters Vessel

A portable communications pack, including monitors, can be supplied to any vessel of opportunity used as a command and control station. An example of one such vessel is the MSRC SPILL RESPONDER.

Safety and Personnel

Safety is possibly the most important and difficult area of concern in any hazardous spill scenario. The known dangers are myriad and the unknowns can create new real-time problems.

Safety is a prime factor in response deployment. This leads to the concept of remotely piloted craft capable of sustaining operation with reduced operator fatigue and exposure to toxic materials or dangerous conditions.

Continuous review of equipment and operational plans will assure compliance with the latest safety requirements. Communications networks will be established with authorities and protocols delineated in contingency plans prior to deployment. This will insure that safety information is received and passed throughout the operation.

Field Operations

Twenty-four hour operations are possible with a relatively small crew using remote controls and GPS. The demands for manpower are at their greatest during deployment of the system. Once the system has been deployed, this group will be separated into operational crews and routine shifts will then be established.

Cross-training and practice will allow the crew members to be used interchangeably and to reduce the number of specialists required. The computer will control most of the operations, routine radio traffic and status reports.

Wildlife Rescue

Once again, the UTILITY VESSEL is put to use. This vessel includes a specially designed deck with equipment on board for the purpose of rescue and acute care of sea mammals, birds and animals. This vessel also includes designs for the deployment and retrieval of rescue divers. These designs lead to an application by the U.S. Navy in its SEALS program. Coordination with wildlife rescue organizations will assist in developing methods and equipment for the retrieval, care and transportation of creatures which may be encountered during operations.

Harbor Systems

Every boat harbor around the world produces debris of all kinds. Some of this debris is floating hazardous waste. Although there exist a few small systems capable of cleaning up floating debris, those with which we are familiar are not designed to clean up large oil spills. The system of the present invention can be used in the harbor configuration on a regular basis to cleanse unsightly water. It can also be prepared to fight vessel and waterfront fires.

When needed, it can be called upon to join a major oil spill team. (This concept is described by the U.S. Coast Guard and the California Department of Fish and Game as "CASCADING.") The regular use of the harbor system will assure a trained and ready crew for shoreline protection from minor oil spills.

The Harbor System includes the following components:
1. 2 RRVs 221
2. 1 Harbor skimmer 21
3. 1 Command utility vessel 235
4. 1 TSD shipping container 231
5. 3 Five thousand (5,000) gallon unitor oil bags 201

Remote Response Vessel

Two RRVs 221 are used to "herd" the floating debris into the skimmer 38 and to fight harbor fires.

Harbor Skimmer

This is a scaled-down version of the open ocean skimmer 38 designed to operate in tighter quarters where maneuverability is an important consideration.

Command Utility Vessel

This vessel 235 is equipped with its usual compliment of equipment and a 3,000 gallon recovery tank. It also has an Harbor Skimmer 38 attached to its bow. The recovery tank and skimmer 38 can be detached and the vessel 235 can proceed to a major spill scenario with the addition of an open ocean type Skimmer 38.

Tactical Storage Depot (Previously described above).

Unitor Oil Bags

Three 5,000 gallon UNITOR OIL BAGS will be used to contain absorbents, bio-remediation agents, or fire fighting foam.

Shipping Container (TSD)

A TSD shipping container 281 is equipped with oil-water separation and pumping systems can be stationed on shore for the processing of recovered contaminates in a harbor. It can also be launched to become part of the TSD in an ocean response system.

Lake and River Systems

These systems contain the same components as the Harbor System with some modifications which will be determined by the needs of a given location.

Important Points

1. The harbor system of the present invention has 2,850 barrels per eight hour shift recovery capabilities. Ninety eight percent of all oil spills are 2,500 barrels or less and can occur every day in a large harbor.

2. The RRVs 221 can be used as an aeration system for dead anchovy or other species and for the containment and control of algae.

3. The system of the present invention can clean up floating fluids, solids and effluent.

4. The system of the present invention can recover some contaminates that are suspended in the water below the surface with addition of some very simple equipment. One such event occurred in 1991 in the Sacramento River in California when a chemical spill floated a few feet below the surface and eventually ended up in Lake Shasta due to inadequate recovery techniques.

5. The system of the present invention is maneuverable in confined areas.

6. The RRVs can be operated as fire boats using remote control so as to isolate operators from danger.

7. The RRVs can distribute fire foam, absorbents and bio-remediation agents.

8. The harbor skimmer of the present invention and recovery tank can be easily removed from the command utility vessel and replaced with an open ocean skimmer. The vessel can then be deployed as an integral part of an ocean response system.

9. The Harbor System of the present invention can also operate in rivers, lakes, bays and inland waterways all over the world.

10. Finally, the California Department of Fish and Game identifies the multi-use capabilities of the present invention as "cascading." This provides the user with a versatile system capable of doing many jobs with one investment in equipment.

Ocean Response System (ORS)

The ORS consists of the following components:
1. 6 Remote response vessels
2. 1 Command utility vessel
3. 1 Open ocean skimmer
4. 4 Utility transfer vessels
5. 1 Wildlife rescue vessel
6. 1 Tactical storage depot
7. 1 Oil transfer manifold
8. 1 Fuel container
9. 1 Equipment container
10. 1 Crew container
11. 10 Fifteen thousand (15,000) gallon unitor oil transfer bags
12. 4 One hundred thirty thousand (130,000) gallon unitor oil storage bags

Tanker and Drilling Platform Response Systems

The tanker and drilling platform response system includes:
1. 2 rrvs
2. 1 utility vessel
3. 1 skimmer
4. 4 Fifteen Thousand (15,000) gallon unitor oil bags

Deployment

The design of the present invention addresses the defined shortfalls experienced in past spills. Areas that can be improved have been identified from U.S. Coast Guard incident logs and incorporated into the system concept.

The first operation is to unpack the shipping containers (FIG. 28) which have been holding Remote Response Vessel 221 and other equipment. The RRVs 221 are now in the water to rendezvous with the Command Utility Vessel (CUV) 235 at the spill site with the high speed skimmer 38 attached to its bow. The shipping containers 281 are sealed and towed by other Utility Vessels 21 to the spill site, ready to perform the tasks of fuel tanker, equipment storage and oil-water separation and transfer.

The lead RRVs 221, in a formation we call "Oil Deflection Formation" (ODF), equipped with high pressure, high volume water nozzles we call P-JETs 223, are aggressively herding and directing the floating oil to the skimmer 38. Understanding the P-JET theory and why it works, is described in the disclosures of U.S. Pat. No. 4,425,240.

The P-JETS enable the system to operate in motion at six knots by creating a wake and current that persists up to a full minute. The oil or unwanted floating substances or materials are moved laterally away from the wake in the direction of travel. There are no anchors, ropes, buoys or booms to limit motion. All of the conditions of wind, ocean currents, waves or harbor chop are in motion. The system of the present invention therefore operates in motion with unlimited range.

The oil is collected by the high speed, high volume skimmer 38, which also provides the system's first stage of oil-water separation. The second stage of oil/water separation is accomplished with use oil/water separation equipment mounted on the skimmer host vessel 21. The oil is then transferred to trailing UNITOR oil bags 201, where the next stage of oil-water separation takes place. The oil rises to the top and the water is pumped from the bottom during the transfer process so as to be "decanted."

The full oil transfer bags 201 are immediately replaced by empty bags and transferred by Utility Vessels 21 to a Tactical Storage Depot (TSD), for further oil-water separation and transfer to the larger UNITOR oil storage bags 233. This is the first effective system designed to dynamically operate on inland, coastal and offshore waters to aggressively pursue and direct the spilled material to high capacity collection and storage devices. The system of the present invention is not forced to cease operations because of limited storage capacity, fog, darkness, currents, weather or human fatigue. These conditions have all hindered past recovery efforts.

What is claimed is:

1. A skimmer for mounting on a vessel and for being plowed through an oil spill at a relatively high speed to recover oil from water, which vessel has a storage unit for storing the recovered oil, said skimmer comprising:
   a) a conveyor transporting oil from the surface of the water to the storage unit, wherein said conveyor has an entrance disposed in the water and near the surface of the water; and b) a biaxial mounting device for connecting the conveyor to the vessel to maintain the entrance of the conveyor level at the water surface despite pitching and rolling of the vessel;

c) at least two variable ballast controlled pontoons being mounted to the conveyor near the entrance of the conveyor and maintaining the entrance of the conveyor at a minimal depth, whereby the minimal depth is controllable by an operator on the vessel and forces on the conveyor can be minimized to permit plowing the skimmer plowed through the water at the relatively high speed; and d) at least two plunging water jets mounted on the conveyor at the entrance of the conveyor to guide the oil onto the conveyor.

2. The skimmer according to claim 1, wherein the biaxial mount further comprises:

a) a first pivotal mounting device allowing the skimmer to pivot on a first axis independently of the pitch of the vessel; and b) a second pivotal mounting device allowing the skimmer to pivot on a second axis independently of the roll of the vessel, wherein the first axis is perpendicular to the second axis.

3. The skimmer according to claim 1, further comprising a solid debris conveyor mounted below the conveyor to return solid debris to the water or to a separate storage unit.

4. The skimmer according to claim 4, further comprising:

a) a frame on which the biaxial mount is attached and on which the conveyor is supported;

b) a first pivotal mount for one of the two ballast controlled pontoons mounting the one ballast controlled pontoon to the frame;

c) a second pivotal mount for the other of the two ballast controlled pontoons; and d) a shaft coupling the two pivotal mounts together, and being attached to the frame.

5. The skimmer according to claim 1, wherein each of the at least two variable ballast controlled pontoons comprises:

a) an inflatable bladder, b) a line for coupling to a compressed air source;

c) a chamber in which the bladder is disposed; and d) at least one vent into which water flows when the bladder deflates and out of which water flows when the bladder inflates.

6. The skimmer according to claim 1, wherein the conveyor comprises a main conveyor and a secondary conveyor disposed beneath the main conveyor.

7. The skimmer according to claim 6, wherein the secondary conveyor comprises:

a) a collection channel into which oil drains from the main conveyor, wherein said collection channel is mounted below the main conveyor;

b) an auger disposed in the collection channel; and c) a sump into which the auger pushes the oil.

8. The skimmer according to claim 1, wherein the conveyor comprises:

a) a temporary storage unit for storing recovered oil;

b) an endless belt carrying oil to the temporary storage unit from the water surface; and c) an hydraulic drive mechanism driving the endless belt.

9. The skimmer according to claim 8, wherein the endless belt comprises a mesh material.

10. The skimmer according to claim 8, wherein the endless belt comprises a material having a plurality of pockets.

11. The skimmer according to claim 8, further comprising a sweeper being mounted at a top of the conveyor and sweeping the oil from the endless belt into the temporary storage unit.

12. An integrated system for cleaning up an oil spill comprising:

a) a plurality of oil recovery vessels, each oil recovery vessel including:

(I) a storage unit for storing recovered oil; and (ii) a skimmer being mounted on a front of the oil recovery vessel and for being plowed through the oil spill at a relatively high speed, said skimmer comprising:

(1) a conveyor transporting oil from the surface of the water to the storage unit, wherein said conveyor has an entrance disposed in the water and near the surface of the water; and (2) a biaxial mounting device for connecting the skimmer to the oil recovery vessel to maintain the entrance of the skimmer level at the water surface despite pitching and rolling of the oil recovery vessel;

(3) at least two variable ballast controlled pontoons being mounted to the conveyor near the entrance of the conveyor and maintaining the entrance of the conveyor at a minimal depth, whereby the minimal depth is controllable by an operator on the oil recovery vessel and forces on the conveyor can be minimized to permit plowing the skimmer plowed through the water at the relatively high speed, and (4) at least two plunging water jets mounted on the conveyor at the entrance of the conveyor to guide the oil onto the conveyor, and (iii) a plurality of temporary oil storage bags which are filled with oil from the storage unit and then released by the oil recovery vessel for later retrieval;

b) a plurality of oil directing vessels, each vessel including a plurality of plunging water jets mounted on it to keep the oil from spreading and to direct the oil towards the oil recovery vessels;

c) a headquarters vessel having a communication system for communicating with the oil directing vessels and the oil recovery vessels to manage the cleanup, and having a global positioning system for monitoring locations of the oil recovery vessels and the oil directing vessels;

d) a plurality of storage containers for transporting the system to the oil spill site, said storage containers designed to fit in standard cargo bays, d) a plurality of sensors to detect direction, speed, engine statistics, depth, wind, wave data and other pertinent information; and e) an oil detection system for detecting the presence of oil on the water surface.

\* \* \* \* \*